United States Patent [19]

Zeidler et al.

[11] 4,315,756

[45] Feb. 16, 1982

[54] OIL-SOLUBLE AZO DYE WITH N-SUBSTITUTED β-NAPHTHYLAMINE AS COUPLING COMPONENT

[75] Inventors: Georg Zeidler, Limburgerhof; Johannes Dehnert; Guenter Hansen, both of Ludwigshafen; Guenther Riedel, Heidelberg-Wieblingen, all of Fed. Rep. of Germany

[73] Assignee: BASF Aktiengesellschaft, Fed. Rep. of Germany

[21] Appl. No.: 529,900

[22] Filed: Dec. 5, 1974

[51] Int. Cl.$^3$ .......................... C10L 1/10; C10L 1/22; C09B 35/02; C09B 33/02

[52] U.S. Cl. ............................................ 44/59; 44/64; 260/177; 260/184; 260/191; 260/196

[58] Field of Search ............... 260/191, 196, 177, 184; 44/59, 64

[56] References Cited

U.S. PATENT DOCUMENTS

| | | | |
|---|---|---|---|
| 1,987,309 | 1/1935 | Orelup | 44/9 |
| 2,052,193 | 8/1936 | Rickles | 44/9 |
| 3,004,821 | 10/1961 | Gano | 8/3 |
| 3,049,532 | 8/1962 | Gaetani | 260/191 |
| 3,073,664 | 1/1963 | Spitzer et al. | 8/79 |
| 3,356,443 | 12/1967 | Dziomba | 8/3 |
| 3,476,500 | 11/1969 | Litke | 8/93 |
| 3,690,809 | 9/1972 | Orelup | 8/6 |
| 3,704,106 | 11/1972 | Orelup | 44/59 |
| 3,862,120 | 1/1975 | Orelup | 260/191 |
| 4,056,367 | 11/1977 | Arsac et al. | 44/59 |

*Primary Examiner*—John Doll
*Attorney, Agent, or Firm*—Keil & Witherspoon

[57] ABSTRACT

Monoazo and disazo dyes having an unsubstituted or substituted aniline or p-aminoazobenzene as diazo component and an N-substituted β-naphthylamine of six to eighteen carbon atoms in the N-substituent as coupling component. Preferred diazo components are phenyl, tolyl, phenylazophenyl and tolylazotolyl, and preferred coupling components are provided by β-naphthylamine which is N-monosubstituted by n-hexyl, n-octyl, β-ethylhexyl, 3,5,5-trimethylhexyl, tridecyl, β-ethylhexoxypropyl, cyclohexyl, benzyl or phenylethyl. The dyes are eminently suitable for the coloring of for example mineral oils, gasoline, fats and waxes because of their excellent solubilities.

13 Claims, No Drawings

OIL-SOLUBLE AZO DYE WITH N-SUBSTITUTED β-NAPHTHYLAMINE AS COUPLING COMPONENT

The invention relates to azo dyes and mixtures of azo dyes of the formula:

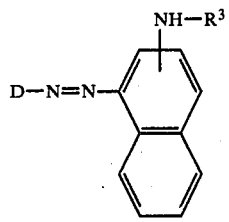

in which

D is phenyl which may bear, as a substituent, alkyl of one to four carbon atoms, methoxy, ethoxy, phenylazo or phenylazo which bears alkyl of one to four carbon atoms, methoxy or ethoxy as a substituent; and $R^3$ is alkyl of four to twenty-one carbon atoms which may be interrupted by oxygen; phenylalkyl of one to four carbon atoms in the alkyl, cycloalkyl of six to eight carbon atoms, phenyl or phenyl bearing alkyl of one to four carbon atoms as a substituent.

Specific examples of substituents for the radical D are: methyl, ethyl, n-propyl, isopropyl, n-butyl, isobutyl, methoxy, ethoxy or phenylazo and also phenylazo bearing these substituents. For reasons of economy the preferred radicals D are methyl, n-propyl or isopropyl and also phenyl and phenylazophenyl.

Specific suitable radicals $R^3$ are alkyl of six to eighteen carbon atoms, alkoxyalkyl radicals of two or three carbon atoms in the alkyl and one to eight carbon atoms in the alkoxy, benzyl, phenylethyl, phenylpropyl, cyclohexyl, methylcyclohexyl, norbornyl, cycloheptyl, cyclooctyl, methylphenyl, ethylphenyl or propylphenyl.

Special attention may be drawn to the following radicals: hexyl, heptyl, β-ethylhexyl, n-octyl, 3,5,5-trimethylhexyl, nonyl, decyl, undecyl, dodecyl, tridecyl, tetradecyl, oxtadecyl, methoxypropyl, ethoxypropyl, butoxypropyl, β-ethylhexoxypropyl, octadecyloxypropyl, cyclohexyl, benzyl and phenylethyl.

Among these special preference is given for economical and technical reasons to n-hexyl, β-ethylhexyl, 3,5,5-trimethylhexyl, tridecyl, β-ethyl hexoxypropyl, cyclohexyl, benzyl and phenylethyl.

The new dyes correspond particularly to the formulae:

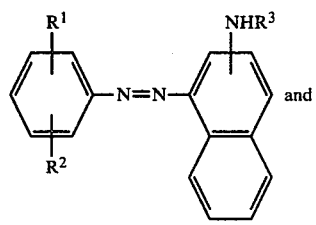 and

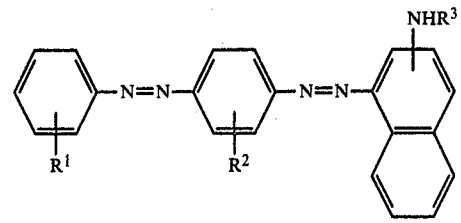

in which $R^1$ and $R^2$ independently of one another may be hydrogen, alkyl of one to four carbon atoms, methoxy or ethoxy and $R^3$ is alkyl of six to thirteen carbon atoms, alkoxypropyl of four to eight carbon atoms in the alkoxy, cyclohexyl, benzyl or phenylethyl and in which the $NHR^3$ group is in the o- or p-position to the azo ridge.

Dyes and dye mixtures according to the invention are normally red oils, waxy substances or powders. They dissolve particularly well in aromatic and aliphatic hydrocarbons and also chlorinated hydrocarbons, esters and alcohols and are therefore suitable for coloring fuels, fuel oils, surface coatings, waxes and fats. Concentrated solutions of dye in hydrocarbons, for example toluene, xylene, high-boiling mixtures of aromatic hydrocarbons, gasoline, kerosene, and paraffin oils, are as a rule stable in storage for an unlimited period in the temperature range from −20° to +50° C., i.e. flocculation or crystallization does not occur. Such solutions are therefore particularly valuable as colorants in the range of concentration preferred in industry of from 20 to 70% and preferably from 40 to 60% by weight.

Mixtures of dyes may consist for example of dyes of formula (I) in which radical $R^3$ may particularly be:

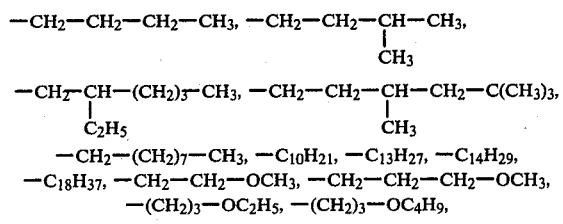

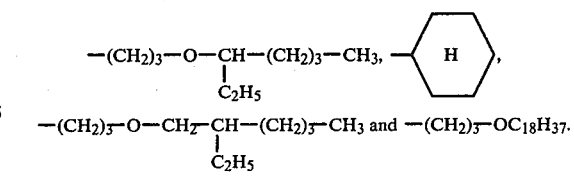

The compounds of formula (I) may be prepared in a simple manner by diazotization of an amine of formula (II):

$$D-NH_2 \tag{II}$$

for example in dilute hydrochloric acid at from 0° to 5° C. with sodium nitrite followed by coupling with an amine of formula (III):

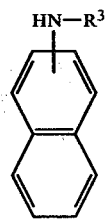

by a conventional method.

It is advantageous to dissolve the coupling components in a high boiling point aromatic hydrocarbon such as toluene or xylene or in a mixture of aromatic hydrocarbons containing essentially naphthalene hydrocarbons, diphenyls, polyphenyl and more highly condensed aromatic ring systems, because in this way a ready-to-use dye solution can be produced without isolating the pure dye. Coupling is generally carried out in a temperature range from 0° to 50° and preferably from 10° to 25° C.

As a result of the coupling reaction there is obtained a comound of formula (I) in dissolved form in practically the quantitative yield.

The organic phase containing the dye may be separated from the aqueous phase to obtain a concentrated dye solution which is immediately suitable in this form for the coloration for example of mineral oil products. The desired concentration of dye in the solution can easily be obtained by appropriate metering of the starting materials. The pure dye may be obtained from the solution for example by distilling off the solvent by a conventional method. Not only uniform dyes but also dye mixtures may be prepared by the use of a plurality of reactants, for example a mixture of two or more coupling components.

The dye solutions can be diluted at will. They are particularly easy to meter unlike the pure dyes or other solid dyes.

The compounds of formula (III) may be prepared by a conventional method from α-naphthol or from β-naphthol and the appropriate amine by condensation or by the Bucherer reaction.

The following Examples illustrate the invention. The parts specified in the Examples are by weight.

EXAMPLE 1

19.7 parts of 4-aminoazobenzene is stirred for about three hours in a mixture of 175 parts of water and 30 parts of 10 N hydrochloric acid at ambient temperature. 100 parts of ice is added followed by a concentrated aqueous solution of 6.9 parts of sodium nitrite. Diazotization is over after from three to four hours at 0° to 5° C. The excess of nitrite is then removed in the usual manner with sulfamic acid. A solution of 26.7 parts of 2-(N-2-ethylhexyl)-naphthylamine in 100 parts of xylene is then dripped into the suspension of the diazonium salt with intense stirring at 10° to 15° C. Coupling is over after about five hours at 15° to 20° C. The mixture is neutralized with dilute caustic soda solution and the aqueous phase is separated. The xylene is distilled off from the dye solution. 49 parts of a red oil of the formula:

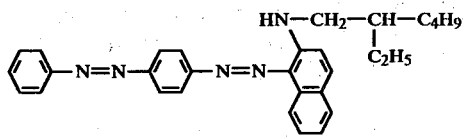

is obtained. It is miscible in all proportions with aromatic and aliphatic hydrocarbons and is very well suited to coloring motor fuels, fuel oils, surface coatings, waxes and fats.

EXAMPLE 2

22.5 parts of 4-amino-3,2'-dimethylazobenzene is diazotized as described in Example 1 and then coupled with 26.7 parts of 2-(N-2-ethylhexyl)-naphthylamine. A red oil of the formula:

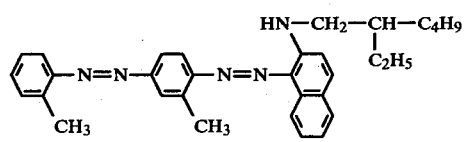

is obtained which has good solubility in aromatic and aliphatic hydrocarbons and which is very suitable for coloring motor fuels, fuel oils, surface coatings, waxes and fats.

EXAMPLE 3

A red dye of the formula:

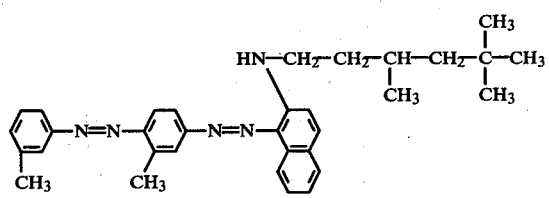

having similar properties to that obtained in Example 1 is obtained in a yield of 47 parts from 22.5 parts of 4-amino-2',3-dimethylazobenzene and 28.2 parts of 2-(N-3,5,5-trimethylhexyl)-naphthylamine in accordance with Example 1.

EXAMPLE 4

28.5 parts of 4-amino-2,3'-dipropylazobenzene is reacted with 34.1 parts of 2-(N-tridecyl)-naphthylamine analogously to Example 1. The dye formed which has the formula:

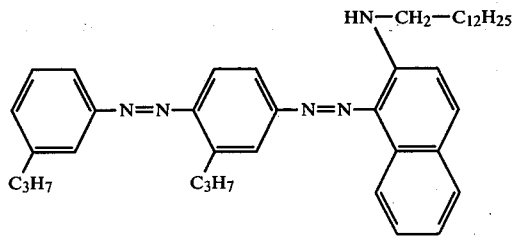

has properties similar to those of the compounds of the preceding Examples.

EXAMPLE 5

22.5 parts of 4-amino-3,2'-dimethylazobenzene is reacted with 25 parts of 2-(N-3-heptyl)-naphthylamine analogously to Example 1 to form the dye of the formula:

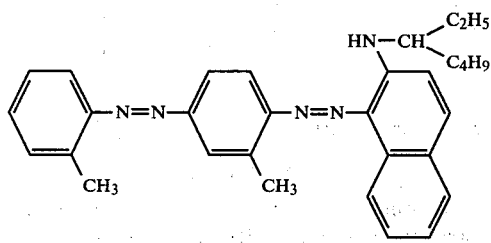

45 parts of the dye is obtained in the form of a red oil.

EXAMPLE 6

By the method described in Example 1 47 parts of the dye of the formula:

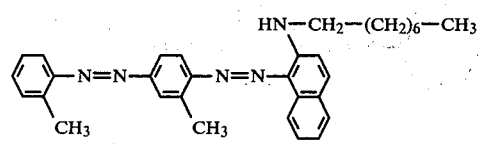

is obtained from 22.5 parts of 4-amino-3,2'-dimethylazobenzene and 26.7 parts of 2-(N-n-octyl)-naphthylamine.

EXAMPLE 7

22.5 parts of 3,2'-dimethylazobenzene is diazotized as described in Example 1. A solution of 13.4 parts of 2-(N-2-ethylhexyl)-naphthylamine and 17.0 parts of 2-(N-tridecyl)-naphthylamine in 100 parts of toluene is then dripped into the suspension of the diazonium salt which is devoid of nitrite. The mixed coupling is over after about five hours. The mixture is diluted with dilute caustic soda solution. The aqueous phase is separated. The xylene is distilled off from the dye solution. 43 parts of a red oily mixture of two dyes of the formulae

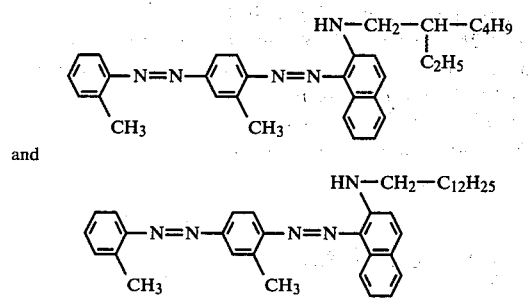

is obtained. It dissolves well in aromatic and aliphatic hydrocarbons. These solutions have an unlimited shelf life at a temperature of $-20°$ C. and are ready for use as agents for identifying mineral oil products.

EXAMPLE 8

22.5 parts of 4-amino-2,3'-dimethylazobenzene is diazotized as described above and then reacted with 13.4 of 2-(N-2-ethylhexyl)-naphthylamine and 17.0 parts of 2-(N-tridecyl)-naphthylamine analogously to Example 7 to form a mixture of the dyes of the formulae:

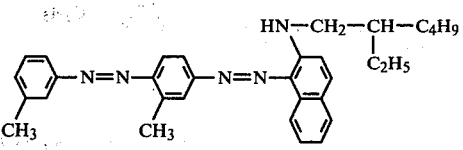

and

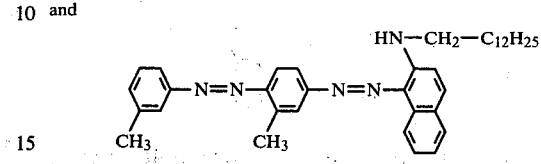

in a yield of 50 parts. It has properties similar to the mixture of Example 7.

EXAMPLE 9

19.7 parts of 4-aminoazobenzene is diazotized as above described and then coupled with 13.4 parts of 2-(N-2-ethylhexyl)-naphthylamine and 12.6 parts of 2-(N-3-heptyl)-naphthylamine as described in Example 7 to form a mixture of dyes of the formulae:

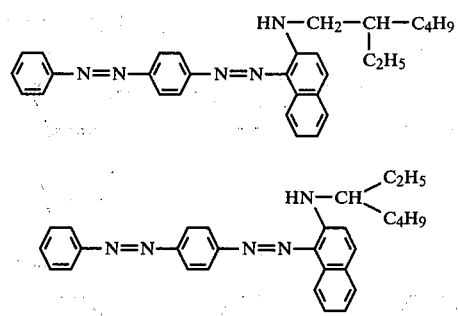

The yield is 44 parts of a red oil.

EXAMPLE 10

19.7 parts of 4-aminozobenzene is diazotized as described in Example 1 and then treated with a mixture of 13.4 parts of 2-(N-2-ethylhexyl)-naphthylamine and 13.4 parts of 2-(N-n-octyl)-naphthylamine to form a mixture of the dyes of the formulae:

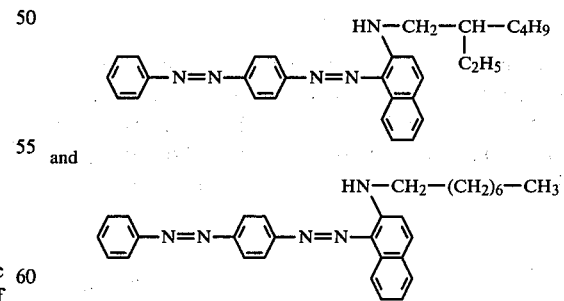

The yield is 45 parts of a red oil.

EXAMPLE 11

22.5 parts of 4-amino-3,2'-dimethylazobenzene is diazotized as described in Example 1 and then reacted to form a mixture of dyes of the formula:

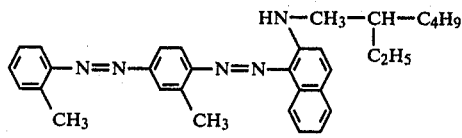

and

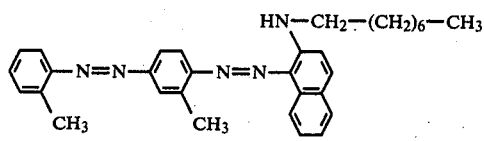

which has similar properties. The yield is 48 parts.

EXAMPLE 12

A mixture of 9.85 parts of 4-aminoazobenzene and 11.25 parts of 4-amino-2,3'-dimethylazobenzene is diazotized as described in Example 1 and then coupled with a solution of 34.0 parts of 2-(N-tridecyl)-naphthylamine in 100 parts of xylene by a conventional method to form a dye mixture of the composition:

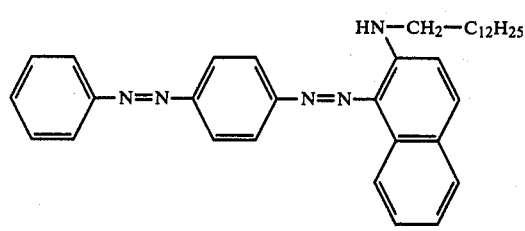

and

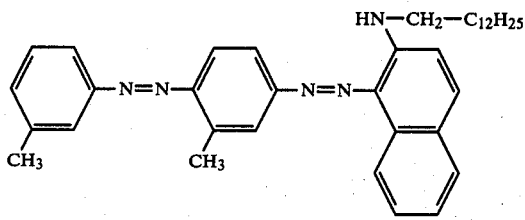

53.0 parts of a red oil is obtained which is suitable for coloring motor fuels, fuel oils, surface coatings, waxes and fats.

EXAMPLE 13

The mixture of a diazonium salt prepared according to Example 12 is coupled by a conventional method with a solution of 25.3 parts of 2-(N-3-heptyl)-naphthylamine in xylene. A dye mixture is obtained having similar properties and having the composition:

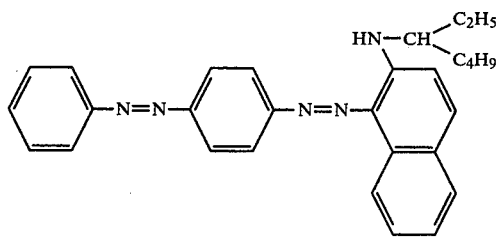

and

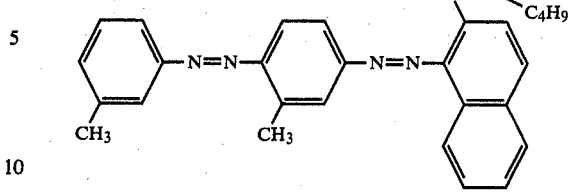

The yield is 45 parts of a ed oil.

EXAMPLE 14

A diazonium salt mixture from 9.85 parts of 4-aminoazobenzene and 11.25 parts of 4-amino-3,2'-dimethylazobenzene is reacted according to Example with a solution of 34.0 parts of 2-(N-tridecyl)-naphthylamine in xylene. A red oil of the following composition is obtained:

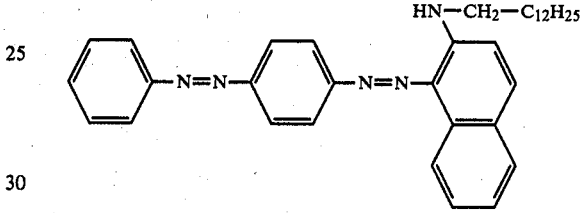

and

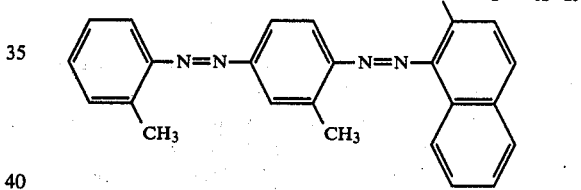

The yield is 52 parts.

EXAMPLE 15

A diazonium salt mixture from 9.85 parts of 4-aminoazobenzene and 11.25 parts of 4-amino-3,2'-dimethylazobenzene is coupled as in Example 1 with a solution of 26.7 parts of 2-(N-2-ethylhexyl)-naphthylamine in a mixture of high boiling point aromatic hydrocarbons (boiling range from 180° to 315° C.). There is formed in the solution a dye mixture having the composition represented by the formulae:

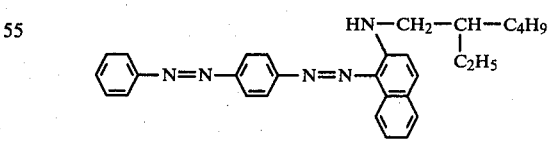

and

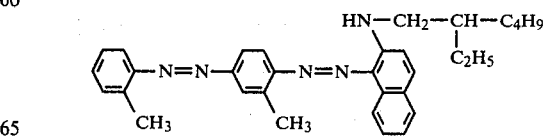

The solution may be used immediately for coloring mineral oil products.

EXAMPLE 16

11.25 parts of 4-amino-3,2'-dimethylazobenzene and 11.25 parts of 4-amino-2,3'-dimethylazobenzene are reacted as described in Example 1 with 26.7 parts of 2-(N-2-ethylhexyl)-naphthylamine to form the following dye mixture:

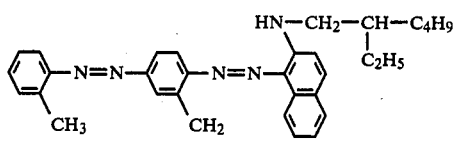

and

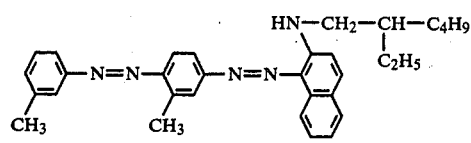

The yield is 46 parts as a red oil.

EXAMPLE 17

The diazonium salt mixture of Example 16 is reacted as described in Example 1 with 26.7 parts of 2-(N-n-octyl)-naphthylamine. An oily dye is obtained having the composition:

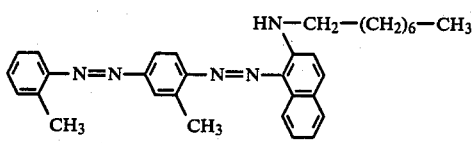

and

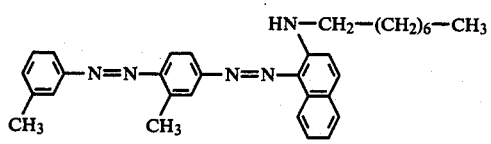

It has similar properties. The yield is 42 parts.

EXAMPLE 18

A mixture of 9.85 parts of 4-aminoazobenzene and 11.25 parts of 4-amino-3,2'-dimethylazobenzene is diazotized as described in Example 1. A solution of 13.4 parts of 2-(N-2-ethylhexyl)-naphthylamine and 17.0 parts of 2-(N-tridecyl)-naphthylamine in 100 parts of xylene is then dripped into the suspension of the diazonium salt which has been freed from nitrite. The mixed coupling is over after about five hours. The mixture is made neutral with dilute caustic soda solution. The aqueous phase is separated. The xylene is distilled off from the dye solution. 43 parts of a red oil is obtained which consists of the following dyes:

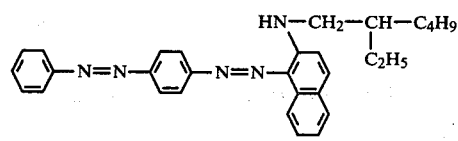

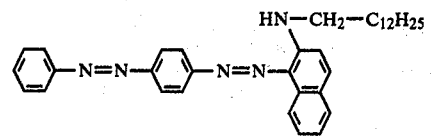

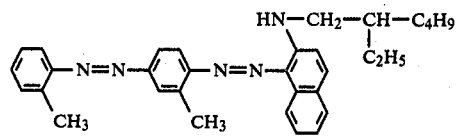

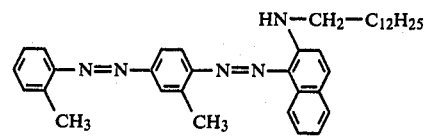

It has unlimited solubility in aromatic and aliphatic hydrocarbons with a red coloration. It may be used for coloring motor fuels, fuel oils, surface coatings, waxes and fats.

EXAMPLE 19

A mixed diazonium salt, prepared as described in Example 18, is coupled with a solution of 13.4 parts of 2-(N-2-ethylhexyl)-naphthylamine and 13.4 parts of 2-(N-n-octyl)-naphthylamine in xylene. A mixture of dyes having similar properties and having the following composition is formed:

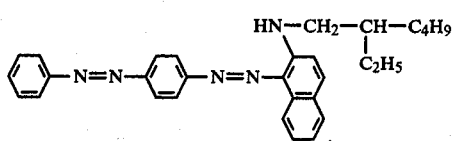

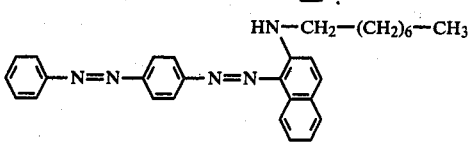

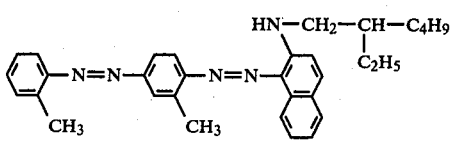

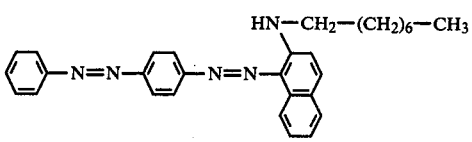

EXAMPLE 20

11.3 parts of 4-amino-3,2'-dimethylazobenzene and 11.3 parts of 4-amino-2,3'-dimethylazobenzene are together diazotized as described in Example 1 and then reacted with a solution of 13.4 parts of 2-(N-2-ethylhexyl)-naphthylamine and 12.6 parts of 2-(N-3-heptyl)-naphthylamine to form the following dye mixture having similar properties:

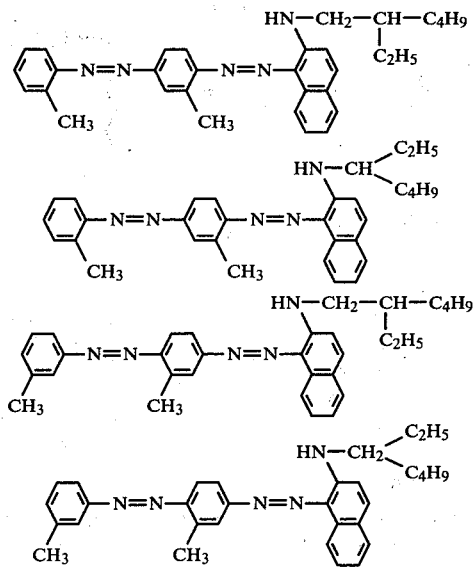

EXAMPLE 21

The mixed diazonium salt from 9.85 parts of 4-aminoazobenzene and 11.25 parts of 4-amino-3,2'-dimethylazobenzene is reacted by the method of Example 1 with a solution of 17.0 parts of 2-(N-tridecyl)-naphthylamine and 12.6 parts of 2-(N-3-heptyl)-naphthylamine to form the following dye mixture having similar properties:

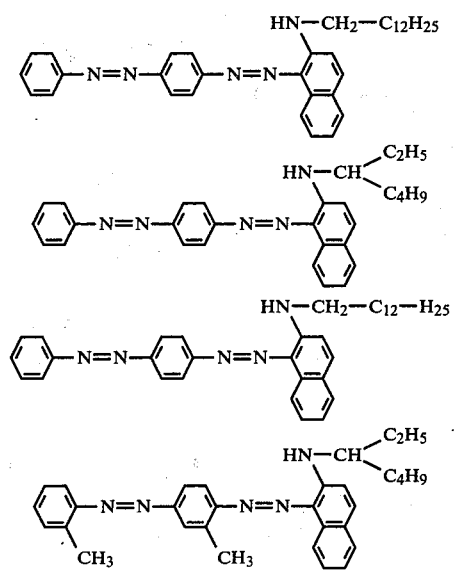

A red oil is obtained which has outstanding solubility in hydrocarbons.

EXAMPLE 22

19.7 parts of 4-aminoazobenzene is stirred in a mixture of 175 parts of water and 30 parts of 10 N hydrochloric acid for about three hours at ambient temperature. 100 parts of ice is added followed by a concentrated aqueous solution of 6.9 parts of sodium nitrite. Diazotization is over after from three to four hours at from 0° to 5° C. The excess of nitrite is then removed as usual with sulfamic acid. A solution of 26.7 parts of '-(N-2-ethylhexyl)-naphthylamine in 100 parts of xylene is then dripped into the suspension of the diazonium salt at from 10° to 15° C. with intense stirring. Coupling is over after about five hours at 15° to 20° C. The mixture is neutralized with dilute caustic soda solution and the aqueous phase is separated. The xylene is distilled off from the dye solution and 49 parts of a red oil is obtained having the formula:

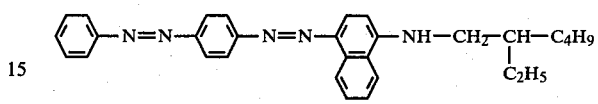

It is readily soluble in aromatic and aliphatic hydrocarbons and is very suitable for coloring motor fuels, fuel oils, surface coatings, waxes and fats.

EXAMPLE 23

By the method described in Example 22 a red dye of the formula

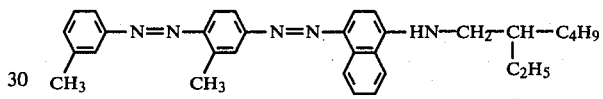

having similar properties is obtained in a yield of 43 parts from 22.5 parts of 4-amino-2,3'-dimethylazobenzene and 26.7 parts of 1-(N-2-ethylhexyl)-naphthylamine.

EXAMPLE 24

22.5 parts of 4-amino-3,2'-dimethylazobenzene is reacted with 34.1 parts of 1-(N-tridecyl)-naphthylamine as described in Example 22. A red dye of the formula:

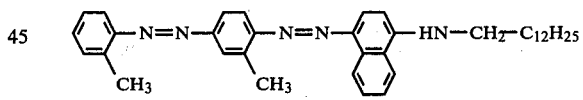

is obtained which has similar properties. The yield is 52 parts.

EXAMPLE 25

22.5 parts of 4-amino-3,2'-dimethylazobenzene is reacted with 25.3 parts of 1-(N-3-heptyl)-naphthylamine as described in Example 22 to give 43 parts of a waxy dye of the formula:

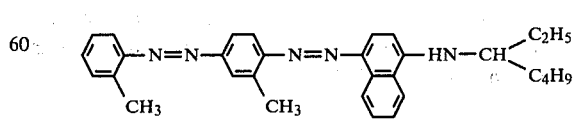

EXAMPLE 26

As described in Example 22 a compound of the formula:

$$\langle\!\!\!\!\bigcirc\!\!\!\!\rangle\!-\!N\!=\!N\!-\!\langle\!\!\!\!\bigcirc\!\!\!\!\rangle\!-\!N\!=\!N\!-\!\langle\!\!\!\!\bigcirc\!\!\!\!\rangle\!-\!NH\!-\!CH_2(CH_2)_6\!-\!CH_3$$

is obtained from 19.7 parts of 4-aminoazobenzene and 26.7 parts of 1-(N-n-octyl)-naphthylamine. It has similar properties. The yield is 42 parts.

EXAMPLE 27

48 parts of a dye of the formula:

$$\langle\!\!\!\!\bigcirc\!\!\!\!\rangle\!-\!N\!=\!N\!-\!\langle\!\!\!\!\bigcirc\!\!\!\!\rangle\!-\!N\!=\!N\!-\!\langle\!\!\!\!\bigcirc\!\!\!\!\rangle\!-\!HN\!-\!CH_2\!-\!CH_2\!-\!CH\!-\!CH_2\!-\!C\!-\!CH_3$$
with $CH_3$ substituents on the middle rings and $CH_3$, $CH_3$, $CH_3$ on the chain is obtained according to Example 22 from 22.5 parts of 4-amino-3,2'-dimethylazobenzene and 28.2 parts of 1-(N-3,5,5-trimethylhexyl)-naphthylamine.

EXAMPLE 28

According to Example 22 a dye of the formula:

$$\langle\!\!\!\!\bigcirc\!\!\!\!\rangle\!-\!N\!=\!N\!-\!\langle\!\!\!\!\bigcirc\!\!\!\!\rangle\!-\!N\!=\!N\!-\!\langle\!\!\!\!\bigcirc\!\!\!\!\rangle\!-\!HN\!-\!CH_2\!-\!(CH_2)_6\!-\!CH_3$$
with $CH_3$, $CH_3$ substituents having similar properties is obtained in a yield of 46 parts by the reaction of 22.5 parts of 4-amino-2,3'-dimethylazobenzene with 26.7 parts of 1-(N-n-octyl)-naphthylamine.

EXAMPLE 29

22.5 parts of 4-amino-3,2'-dimethylazobenzene is diazotized as described in Example 22. A solution of 13.4 parts of 1-(N-2-etylhexyl)-naphthylamine and 17.0 parts of 1-(N-tridecyl)-naphthylamine in 100 parts of toluene is then dripped into the suspension of the diazonium salt which has been freed from nitrite. The coupling reaction is over after about five hours. The mixture is neutralized with dilute caustic soda solution. The aqueous phase is separated. The toluene is distilled off from the dye solution. 43 parts of a red oily mixture of the two dyes of the formulae:

$$\langle\!\!\!\!\bigcirc\!\!\!\!\rangle\!-\!N\!=\!N\!-\!\langle\!\!\!\!\bigcirc\!\!\!\!\rangle\!-\!N\!=\!N\!-\!\langle\!\!\!\!\bigcirc\!\!\!\!\rangle\!-\!HN\!-\!CH_2\!-\!CH\!-\!C_4H_9$$
with $CH_3$, $CH_3$ substituents and $C_2H_5$ on chain and $$\langle\!\!\!\!\bigcirc\!\!\!\!\rangle\!-\!N\!=\!N\!-\!\langle\!\!\!\!\bigcirc\!\!\!\!\rangle\!-\!N\!=\!N\!-\!\langle\!\!\!\!\bigcirc\!\!\!\!\rangle\!-\!HN\!-\!CH_2\!-\!C_{12}H_{25}$$
with $CH_3$, $CH_3$ substituents is obtained. It dissolves well in aromatic and aliphatic hydrocarbons. These solutions have an unlimited shelf life at temperatures of −20° C. They are ready for use as agents for identifying mineral oil products.

EXAMPLE 30

22.5 parts of 4-amino-2,3'-dimethylazobenzene is diazotized as described above and then reacted analogously to Example 29 with 13.4 parts of 1-(N-2-ethylhexyl)-naphthylamine and 17.0 parts of 1-(N-tridecyl)-naphthylamine to form the mixture of dyes of the formulae:

$$\langle\!\!\!\!\bigcirc\!\!\!\!\rangle\!-\!N\!=\!N\!-\!\langle\!\!\!\!\bigcirc\!\!\!\!\rangle\!-\!N\!=\!N\!-\!\langle\!\!\!\!\bigcirc\!\!\!\!\rangle\!-\!HN\!-\!CH_2\!-\!CH\!-\!C_4H_9$$
with $CH_3$, $CH_3$ substituents and $C_2H_5$ on chain and $$\langle\!\!\!\!\bigcirc\!\!\!\!\rangle\!-\!N\!=\!N\!-\!\langle\!\!\!\!\bigcirc\!\!\!\!\rangle\!-\!N\!=\!N\!-\!\langle\!\!\!\!\bigcirc\!\!\!\!\rangle\!-\!HN\!-\!CH_2\!-\!C_{12}H_{25}$$
with $CH_3$, $CH_3$ substituents having similar properties to the dye mixture of Example 7. The yield is 18 parts.

EXAMPLE 31

19.7 parts of 4-aminoazobenzene is diazotized as described above and then coupled as described in Example 29 with 13.4 parts of 1-(N-2-ethylhexyl)-naphthylamine and 12.6 parts of 1-(N-3-heptyl)-naphthylamine to form a mixture of dyes of the formulae:

$$\langle\!\!\!\!\bigcirc\!\!\!\!\rangle\!-\!N\!=\!N\!-\!\langle\!\!\!\!\bigcirc\!\!\!\!\rangle\!-\!N\!=\!N\!-\!\langle\!\!\!\!\bigcirc\!\!\!\!\rangle\!-\!HN\!-\!CH_2\!-\!CH\!-\!C_4H_9$$
with $C_2H_5$ on chain and $$\langle\!\!\!\!\bigcirc\!\!\!\!\rangle\!-\!N\!=\!N\!-\!\langle\!\!\!\!\bigcirc\!\!\!\!\rangle\!-\!N\!=\!N\!-\!\langle\!\!\!\!\bigcirc\!\!\!\!\rangle\!-\!HN\!-\!CH(C_2H_5)(C_4H_9)$$

The yield is 43 parts of a red waxy substance.

EXAMPLE 32

22.5 parts of 4-amino-3,2'-dimethylazobenzene is diazotized as described above and then processed analogously to Example 31 into a mixture of the dyes of the formulae:

$$\langle\!\!\!\!\bigcirc\!\!\!\!\rangle\!-\!N\!=\!N\!-\!\langle\!\!\!\!\bigcirc\!\!\!\!\rangle\!-\!N\!=\!N\!-\!\langle\!\!\!\!\bigcirc\!\!\!\!\rangle\!-\!HN\!-\!CH_2\!-\!CH\!-\!C_4H_9$$
with $CH_3$, $CH_3$ substituents and $C_2H_5$ on chain and $$\langle\!\!\!\!\bigcirc\!\!\!\!\rangle\!-\!N\!=\!N\!-\!\langle\!\!\!\!\bigcirc\!\!\!\!\rangle\!-\!N\!=\!N\!-\!\langle\!\!\!\!\bigcirc\!\!\!\!\rangle\!-\!HN\!-\!CH(C_2H_5)(C_4H_9)$$
with $CH_3$, $CH_3$ substituents The yield is 45 parts of a red oil.

EXAMPLE 33

19.7 parts of 4-aminoazobenzene is diazotized as described in Example 22 and then reacted with a mixture of 13.4 parts of 1-(N-2-ethylhexyl)-naphthylamine and 13.4 parts of 1-(N-n-octyl)-naphthylamine to form a mixture of the dyes of the formulae:

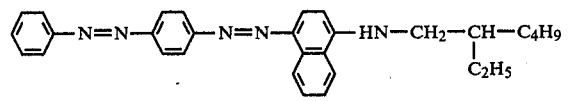

and

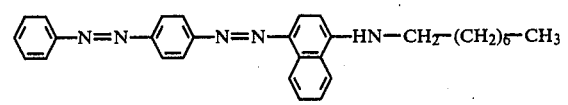

The yield is 43 parts of a red oil.

EXAMPLE 34

22.5 parts of 4-amino-3,2'-dimethylazobenzene is diazotized as described in Example 22 and then converted into a mixture of the dyes of the formulae:

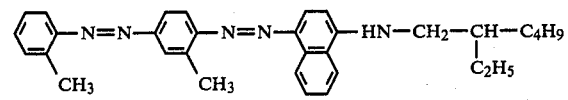

and

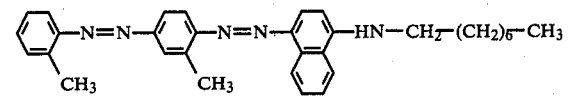

having similar properties. The yield is 47 parts.

EXAMPLE 35

9.85 parts of 4-aminoazobenzene and 11.25 parts of 4-amino-2,3'-dimethylazobenzene are diazotized together analogously to Example 22 and then reacted with a solution of 26.7 parts of 1-(N-β-ethylhexyl)-naphthylamine in 100 parts of toluene to form the following dye mixture:

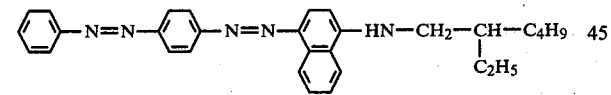

and

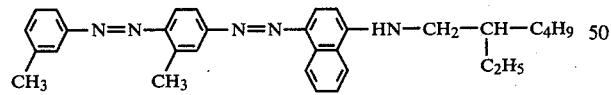

The yield is 46 parts of a red oil.

EXAMPLE 36

A mixture of the diazonium salt prepared according to Example 35 is coupled by a conventional method with 25.3 parts of 1-(N-3-heptyl)-naphthylamine in xylene. A dye mixture having similar properties is obtained; it has the composition:

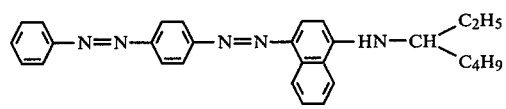

and

-continued

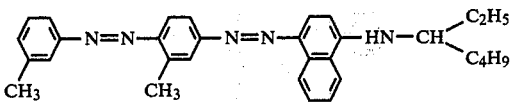

The yield is 44 parts of a red oil.

EXAMPLE 37

A mixture of the composition:

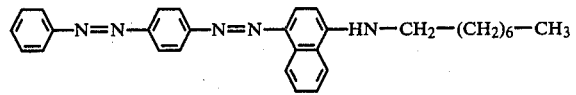

and

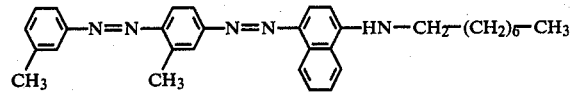

which is similar in properties to the mixture in Example 35 is obtained by coupling a diazonium salt mixture as described in Example 35 with a solution of 26.7 parts of 1-(N-n-octyl)-naphthylamine in xylene. The yield is 45 parts of a red waxy substance.

EXAMPLE 38

A diazonium salt mixture from 9.85 parts of 4-aminoazobenzene and 11.25 parts of 4-amino-3,2'-dimethylazobenzene is reacted according to Example 22 with a solution of 34.0 parts of 1-(N-tridecyl)-naphthylamine in xylene. A red oil is obtained having the following composition:

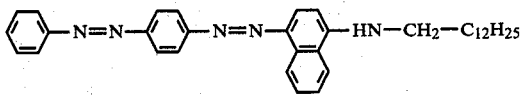

and

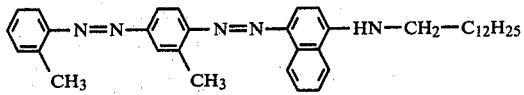

The yield is 50 parts.

EXAMPLE 39

A diazonium salt mixture from 9.85 parts of 4-aminoazobenzene and 11.25 parts of 4-amino-3,2'-dimethylazobenzene is coupled as described in Example 22 with a solution of 26.7 parts of 1-(N-2-ethylhexyl)-naphthylamine in a high boiling point mixture of aromatic hydrocarbons (boiling range from 180° to 315° C.), a mixture of dyes of the formulae

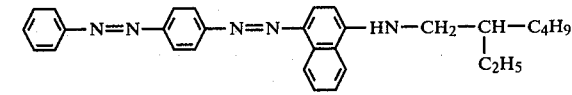

and

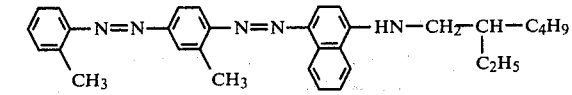

being formed in the solution. The solution may be used immediately for coloring mineral oil products.

EXAMPLE 40

A diazonium salt mixture of the same composition as in Example 15 is coupled according to Example 22 with a solution of 26.7 parts of 1-(N-n-octyl)-naphthylamine in a high boiling point mixture of aromatic hydrocarbons (boiling range from 180° to 220° C.). The dyes formed in the solution have the formulae:

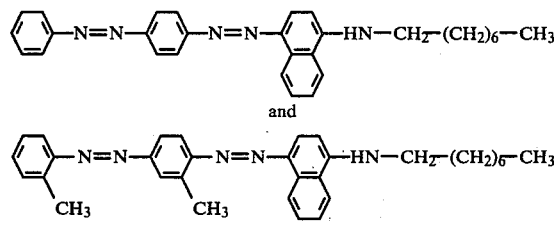

EXAMPLE 41

11.25 parts of 4-amino-3,2'-dimethylazobenzene and 11.25 parts of 4-amino-2,3'-dimethylazobenzene are reacted analogously to Example 22 with 26.7 parts of 1-(N-2-ethylhexyl)-naphthylamine to give the following dye mixture:

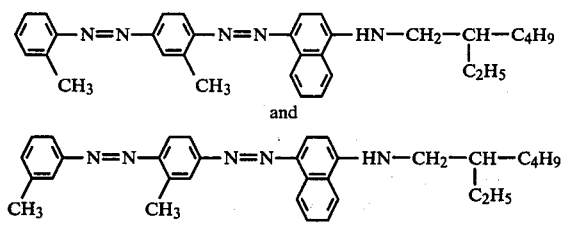

The yield is 45 parts of a red oil.

EXAMPLE 42

The diazonium salt mixture of example 16 is coupled analogously to Example 22 with 25.3 parts of 1-(N-3-heptyl)-naphthylamine. A red oil having similar properties and of the following composition is obtained in a yield of 40 parts.

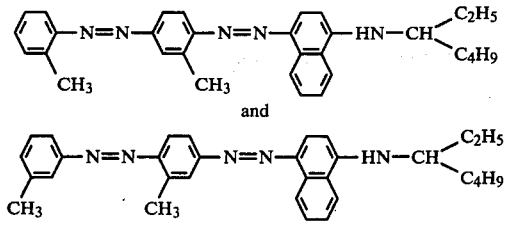

EXAMPLE 43

A mixture of 9.85 parts of 4-aminoazobenzene and 11.25 parts of 4-amino-3,2'-dimethylazobenzene is diazotized as described in Example 22. A solution of 13.4 parts of 1-(N-2-ethylhexyl)-naphthylamine and 17.0 parts of 1-(N-tridecyl)-naphthylamine in 100 parts of xylene is then dripped into the suspension of the diazonium salt which has been freed from nitrite. The coupling is over after about five hours. The mixture is made neutral with dilute caustic soda solution. The aqueous phase is separated and the xylene is distilled off from the dye solution. 42 parts of a red oil is obtained which consists of the following dyes:

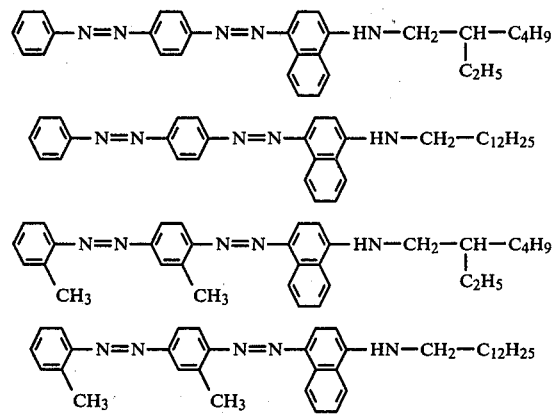

The oil dissolves in all proportions in aromatic and aliphatic hydrocarbons with a red coloration and can be used for coloring motor fuels, fuel oils, surface coatings, waxes and fats.

EXAMPLE 44

A mixed diazonium salt prepared as described in Example 43 is coupled with a solution of 13.4 parts of 1-(N-2-ethylhexyl)-naphthylamine and 13.4 parts of 1-(N-n-octyl)-naphthylamine in xylene. A mixture of the following dyes which are similar in their properties is obtained:

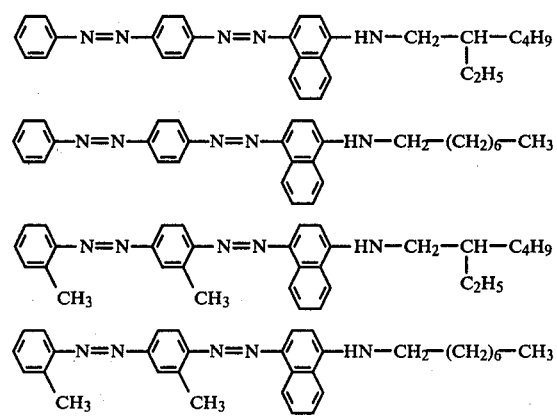

EXAMPLE 45

11.3 parts of 4-amino-3,2'-dimethylazobenzene and 11.3 parts of 4-amino-2,3'-dimethylazobenzene are diazotized together as described in Example 22 and reacted with a solution of 13.4 parts of 1-(N-2-ethylhexyl)-naphthylamine and 12.6 parts of 1-(N-3-heptyl)-naphthylamine to give the following dye mixture:

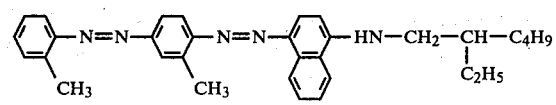

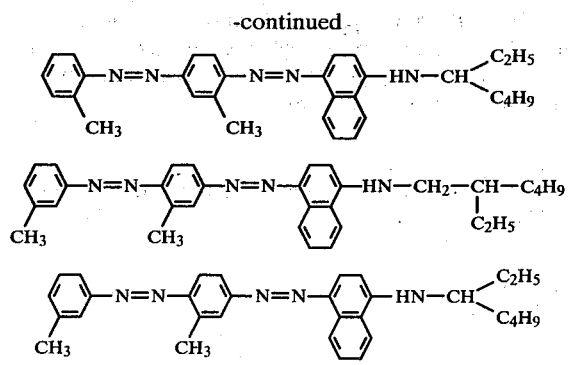

which has similar properties.

EXAMPLE 46

The mixed diazonium salt from 9.85 parts of 4-aminoazobenzene and 11.25 parts of 4-amino-3,2'-dimethylazobenzene is reacted as described in Example 22 with a solution of 17.0 parts of 1-(N-tridecyl)-naphthylamine and 12.6 parts of 1-(N-3-heptyl)-naphthylamine to give the following dye mixture:

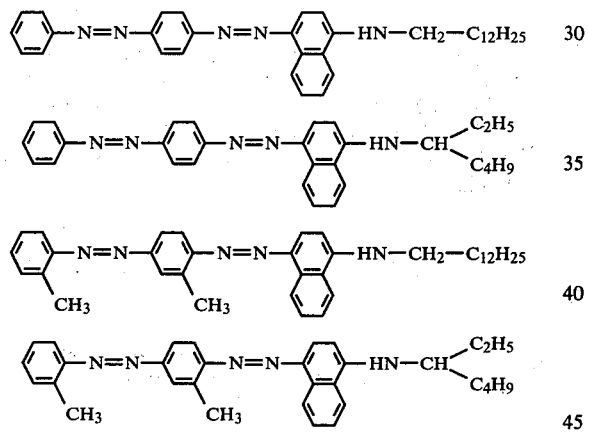

EXAMPLE 47

19.7 parts of 4-aminoazobenzene is stirred for about three hours at ambient temperature in a mixture of 175 parts of water and 30 parts of 10 N hydrochloric acid. 100 parts of ice is added followed by a concentrated aqueous solution of 6.9 parts of sodium nitrite. Diazotization is over after from three to four hours at 0° to 5° C. The excess of nitrite is then removed with sulfamic acid. A solution of 23.5 parts of 2-(N-cyclohexyl)-naphthylamine in 50 parts of glacial acetic acid is then dripped at from 10° to 15° C. with intense stirring into the suspension of the diazonium salt. Coupling is over after stirring overnight. The disazo dye separates in a form in which it can be easily filtered. It is filtered and washed with water until it is neutral and devoid of salts. After drying at 60° C. in vacuo 42 parts of a red powder of the dye of the formula:

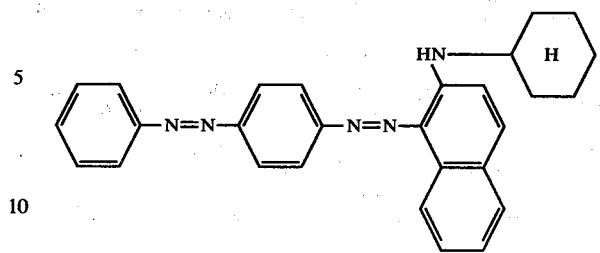

is obtained; it is suitable for coloring oils, fats, waxes and motor fuels.

EXAMPLE 48

22.5 parts of 4-amino-3,2'-dimethylazobenzene is diazotized as described in Example 47 and then coupled with 23.5 parts of 2-(N-cyclohexyl)-naphthylamine. 45 parts of a red powder of the dye of the formula:

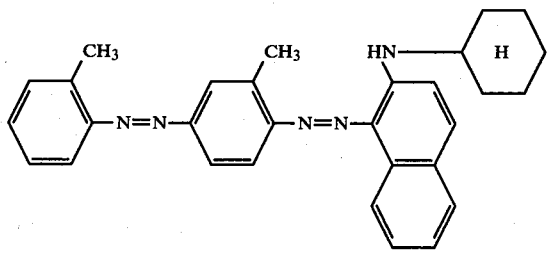

is obtained. The yield is 45 parts.

EXAMPLE 49

22.5 parts of 4-amino-2,3'-dimethylazobenzene is reacted with 23.5 parts of 1-(N-cyclohexyl)-naphthylamine by the method of Example 47. The dye formed which has the formula:

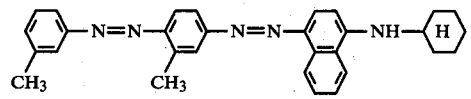

has properties similar to those of the compounds of the foregoing Examples.

EXAMPLE 50

48 parts of a red dye of the formula:

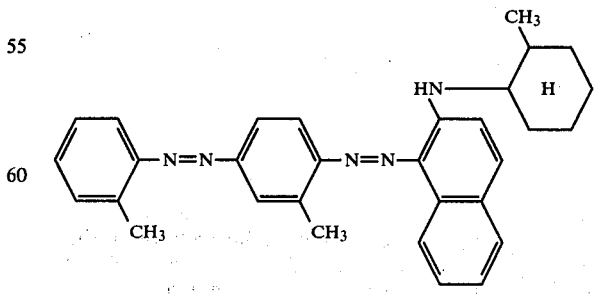

is obtained by the method of Example 47 from 22.5 parts of 4-amino-3,2'-dimethylazobenzene and 25 parts of 2-(N-2'-methylcyclohexyl)-naphthylamine.

EXAMPLE 51

45 parts of a red dye of the formula:

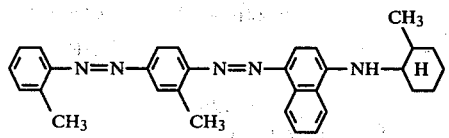

is obtained by reaction of the diazonium salt from 22.5 parts of 4-amino-3,2'-dimethylazobenzene with 25 parts of 1-(N-2'-methylcyclohexyl)-naphthylamine by the method of Example 47.

EXAMPLE 52

19.7 parts of 4-aminoazobenzene is reacted with 23.0 parts of 2-(N-phenyl)-naphthylamine as described in Example 47. 41 parts of a red powder of the dye of the formula:

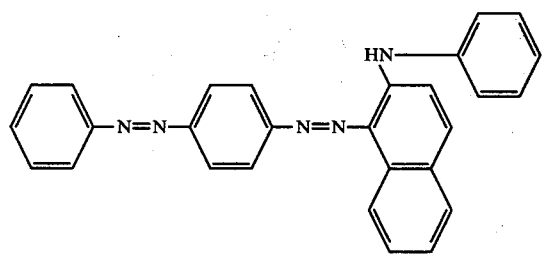

is obtained.

EXAMPLE 53

A red dye of the formula:

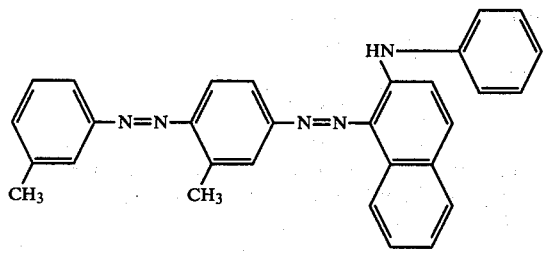

is obtained in a yield of 43 parts from 22.5 parts of 4-amino-2,3'-dimethylazobenzene and 23.0 parts of 2-(N-phenyl)-naphthylamine by following the method of Example 47.

EXAMPLE 54

22.5 parts of 4-amino-3,2'-dimethylazobenzene is reacted with 23.0 parts of 1-(N-phenyl)-naphthylamine as described in Example 47. The dye formed which has the formula:

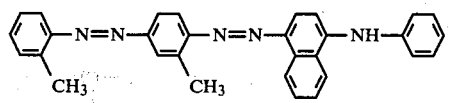

has properties similar to those of the compounds in the foregoing Examples.

EXAMPLE 55

19.7 parts of 4-aminoazobenzene is diazotized as described in Example 47 and coupled with 24.5 parts of 1-(N-benzyl)-naphthylamine. A dye of the formula:

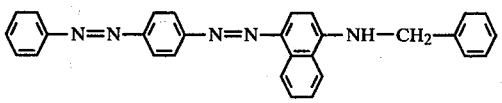

is obtained.

EXAMPLE 56

A red dye of the formula:

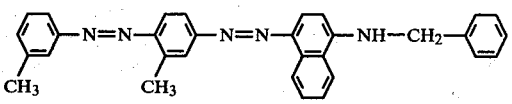

is obtained by the method of Example 47 by reaction of 22.5 parts of 4-amino-2,3'-dimethylazobenzene with 24.5 parts of 1-(N-benzyl)-naphthylamine.

EXAMPLE 57

19.7 parts of 4-aminoazobenzene is diazotized analogously to Example 47 and coupled with 24.5 parts of 2-(N-benzyl)-naphthylamine. A red dye of the formula:

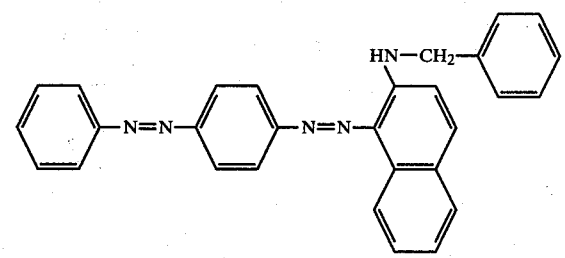

is obtained which has properties similar to these of the compounds in the foregoing Examples.

EXAMPLE 58

47 parts of a red dye of the formula:

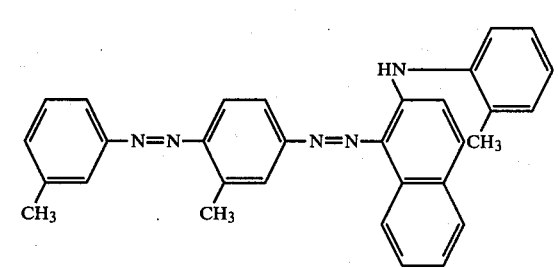

is obtained by the method of Example 47 from 22.5 parts of 4-amino-2,3'-dimethylazobenzene and 24.5 parts of 2-(N-2'-methylphenyl)-naphthylamine.

EXAMPLE 59

The diazonium salt from 22.5 parts of 4-amino-3,2'-dimethylazobenzene is reacted with 24.5 parts of 1-(N-

2'-methylphenyl)-naphthylamine as described in Example 47. A dye of the formula:

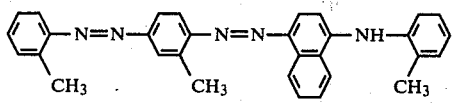

is obtained which has properties similar to these of the compounds of the foregoing Examples.

EXAMPLE 60

19.7 parts of 4-aminoazobenzene is stirred for about three hours at ambient temperature in a mixture of 175 parts of water and 30 parts of 10 N hydrochloric acid. After 100 parts of ice has been added a concentrated aqueous solution of 6.9 parts of sodium nitrite is added. Diazotization is over after from three to four hours at 0° to 5° C. The excess of nitrite is removed as usual with sulfamic acid. A solution of 29.8 parts of 2-(N-$R^3$)-naphthylamine in 100 parts of xylene is then dripped into the suspension of the diazonium salt at 10° to 15°0 C. with intense stirring. The coupling reaction is over after about five hours at 15° to 20° C. The mixture is neutralized with dilute caustic soda solution and the aqueous phase is separated. The xylene is distilled off from the dye solution. 49 parts of a red oil consisting of a mixture of the dyes of the formula:

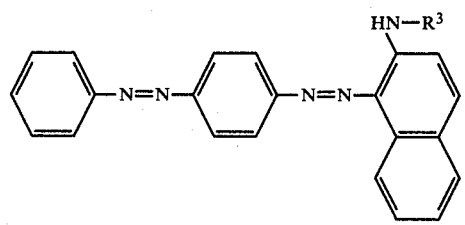

(with $R^3 = -CH_2-CH-(CH_2)_3-CH_3$ and
         |
         $C_2H_5$ $-(CH_2)_3-O-CH_2-CH-(CH_2)_3-CH_3$
                        |
                        $C_2H_5$ in a molar ratio of 1:1) is obtained.

The mixture is miscible in all proportions with aromatic and aliphatic solvents and is suitable for coloring motor fuels, fuel oils, surface coatings, waxes and fats.

EXAMPLE 61

55 parts of a mixture of red dyes of the formula:

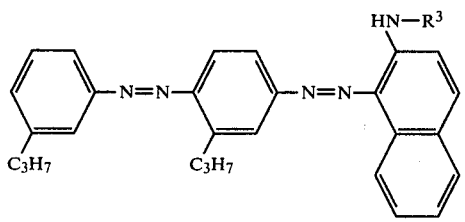

(with $R^3 = -CH_2-CH-(CH_2)_3-CH_3$ and
         |
         $C_2H_5$ $-(CH_2)_3-O-CH_2-CH-(CH_2)_3-CH_3$
                        |
                        $C_2H_5$ in the molar ratio 1:1) is obtained from 28.5 parts of 4-amino-2,3'-dipropylazobenzene and 29.8 parts of 2-(N-$R^3$)-naphthylamine by the method described in Example 60. The mixture can easily be converted by dissolving it in 52 parts of xylene into a concentrated solution of 50% strength which is ready for use and is stable in storage.

EXAMPLE 62

22.5 parts of 4-amino-2,3'-dimethylazobenzene is reacted by the method of Example 60 with 28.7 parts of 1-(N-$R^3$)-naphthylamine. 50 parts of a dye mixture of the composition

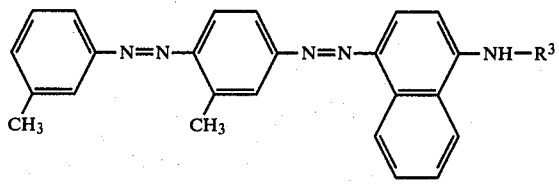

(with $R^3 = -CH_2-CH-(CH_2)_3-CH_3$ and
         |
         $C_2H_5$ $-(CH_2)_3-O-CH_2-CH-(CH_2)_3-CH_3$
                        |
                        $C_2H_5$ in a molar ratio of 2:1) is obtained. It may be converted as described in Example 61 into a concentrated solution which is ready for use.

EXAMPLE 63

22.5 parts of 4-amino-3,2'-dimethylazobenzene is reacted with 28 parts of 2-(N-$R^3$)-naphthylamine as described in Example 60. 51 parts of a dye mixture of the composition:

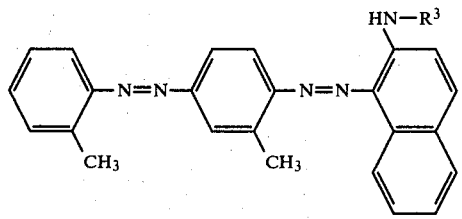

with $R^3 = -CH_2-CH-(CH_2)_3-CH_3$ and
         |
         $C_2H_5$ $-(CH_2)_3-O-CH_2-CH-(CH_2)_3-CH_3$
                        |
                        $C_2H_5$ in a molar ratio 3:1, is obtained in the form of a red oil.

EXAMPLE 64

22.5 parts of 4-amino-3,2'-dimethylazobenzene is reacted with 24.6 parts of 2-(N-R³)-naphthylamine by the method of Example 60. The resulting dye mixture of the composition:

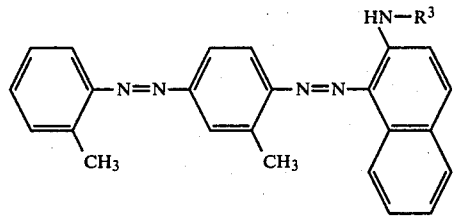

with

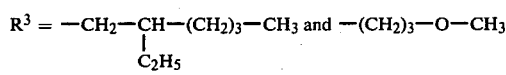

in the molar ratio 1:1 has similar properties to those of the dyes of the foregoing Examples. The yield is 46 parts.

EXAMPLE 65

22.5 parts of 4-amino-3,2'-dimethylazobenzene and 25.4 parts of 2-(N-R³)-naphthylamine are reacted analogously to Example 60. A mixture of dyes of the composition:

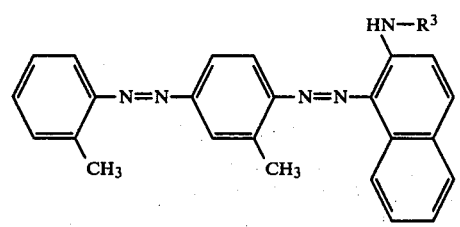

(with

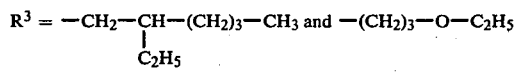

in a molar ratio 1:1) is obtained which has similar properties. The yield is 46 parts.

EXAMPLE 66

The diazonium salt from 22.5 parts of 4-amino-3,2'-dimethylazobenzene is reacted by the method of Example 60 with a solution of 26.2 parts of 1-(N-R³)-naphthylamine in toluene. 49 parts of a mixture of dyes of the composition:

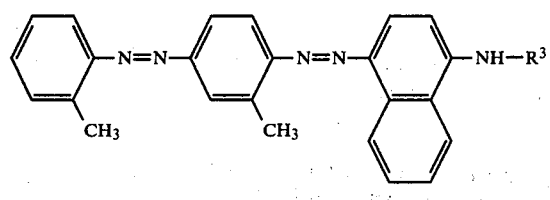

(with

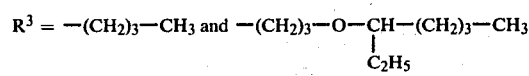

in the molar ratio 1:1) is obtained.

EXAMPLE 67

19.7 parts of 4-aminoazobenzene is reacted as described in Example 60 with a solution of 27.5 parts of 2-(N-R³)-naphthylamine in toluene. A mixture of the dyes of the formula:

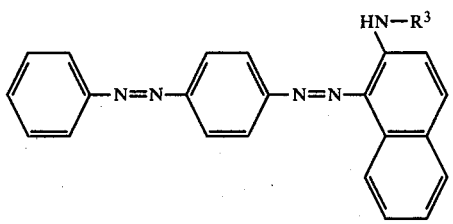

(with

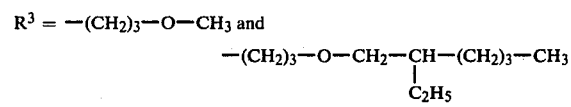

in the molar ratio 1:1) is formed. The yield is 46 parts.

EXAMPLE 68

The procedure described in Example 67 is repeated using 22.5 parts of 4-amino-3,2'-dimethylazobenzene instead of 4-aminoazobenzene. A dye mixture having similar properties and having the composition represented by the formula:

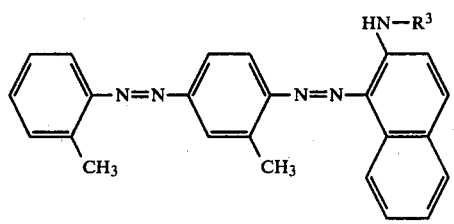

(with

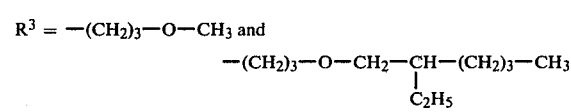

in a molar ratio of 1:1) is obtained. The yield is 48 parts.

EXAMPLE 69

22.5 parts of 4-amino-3,2'-dimethylazobenzene is reacted with 28.5 parts of 1-(N-R³)-naphtyhlamine as described in Example 60. A mixture of dyes having the composition:

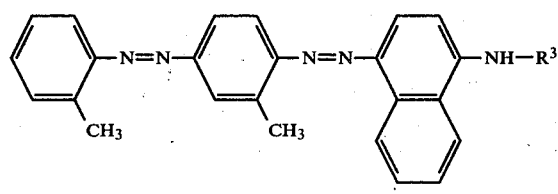

(with $R^3 = -(CH_2)_3-O-C_2H_5$ and $-(CH_2)_3-O-CH_2-CH(C_2H_5)-(CH_2)_3-CH_3$ in the molar ratio 1:1) is obtained.

EXAMPLE 70

19.7 parts of 4-aminoazobenzene is diazotized by a conventional method and then converted with 26.7 parts of 2-(N-$R^3$)-naphthylamine by the method of Example 60 into a mixture of dyes of the formula:

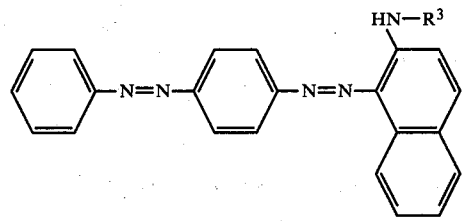

(with $R^3 = -(CH_2)_3-CH_3, -CH_2-CH(C_2H_5)-(CH_2)_3-CH_3$ and $-(CH_2)_3-O-CH_2-CH(C_2H_5)-(CH_2)_3-CH_3$ in the molar ratio 1:1:1). 47 parts of a red oil is obtained which has unlimited solubility in aromatic and aliphatic hydrocarbons and may be used for coloring motor fuels, fuel oils, surface coatings, waxes and fats.

EXAMPLE 71

22.5 parts of 4-amino-2,3'-dimethylazobenzene and 26.7 parts of 2-(N-$R^3$)-naphthylamine are converted according to Example 60 into a mixture of dyes of the formula:

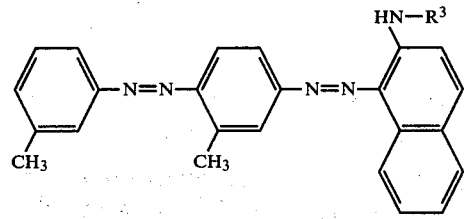

(with $R^3 = -(CH_2)_3-CH_3, -CH_2-CH(C_2H_5)-(CH_2)_3-CH_3$ and $-(CH_2)_3-O-CH_2-CH(C_2H_5)-(CH_2)_3-CH_3$ in the molar ratio 1:1:1) in the form of a red oil.

EXAMPLE 72

22.5 parts of 4-amino-3,2'-dimethylazobenzene is diazotized as described in Example 60 and then coupled with a solution of 27.5 parts of 2-(N-$R^3$)-naphthylamine in xylene. A red oil is obtained which consists of compunds of the compositions represented by the formula:

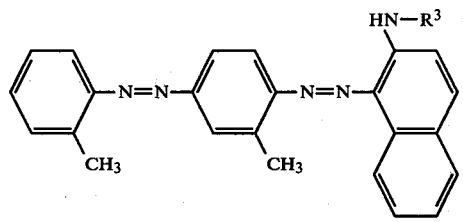

(with $R^3 = -CH_2-CH(C_2H_5)-(CH_2)_3-CH_3,$ $-(CH_2)_3-O-CH_2-CH(C_2H_5)-(CH_2)_3-CH_3$ and $-(CH_2)_3-O-CH_3$ in the molar ratio of 1:1:1). The yield is 49 parts.

EXAMPLE 73

22.5 parts of 4-amino-2,3'-dimethylazobenzene and 23.5 parts of 2-(N-$R^3$)-naphthylamine are reacted according to Example 60. A mixture of compounds of the formula:

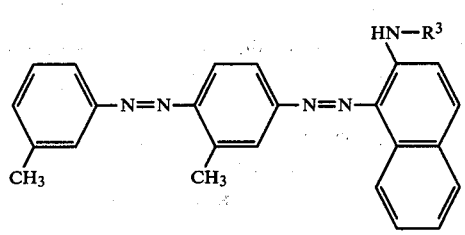

(with $R^3 = -CH_2-CH(C_2H_5)-(CH_2)_3-CH_3, -(CH_2)_3-CH_3$ and $-(CH_2)_3-O-CH_3$ in the molar ratio 1:1:1) is obtained in the form of a red oil in a yield of 45 parts.

EXAMPLE 74

22.5 parts of 4-amino-3,2'-dimethylazobenzene is diazotized and coupled as described in Example 60 with a sodium nitrite. Diazotization is over after thirty minutes at 0° to 5° C. The excess of nitrite is then removed as usual with sulfamic acid. The whole is adjusted to pH from 4 to 5 with sodium acetate. A solution of 26.7 parts of 2-(N-2-ethylhexyl)-naphthylamine in 100 parts of xylene is then dripped into the solution of the diazonium salt. Coupling is over after stirring overnight at 15° to 20° C. The mixture is neutralized with dilute caustic soda solution and the aqueous phase is separated. The xylene is distilled off from the dye solution. 32 parts of a red oil of the formula:

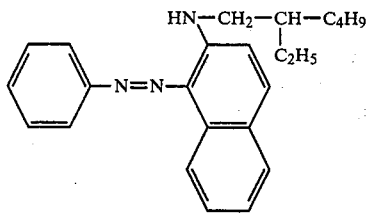

is obtained. It has unlimited miscibility with aromatic and aliphatic hydrocarbons and is very suitable for coloring motor fuels, fuel oils, surface coatings, waxes and fats.

EXAMPLE 80

10.7 parts of 2-methyl-1-aminobenzene is diazotized as described in Example 79 and then coupled with 26.7 parts of 2-(N-2-ethylhexyl)-naphthylamine. A red oil of the formula:

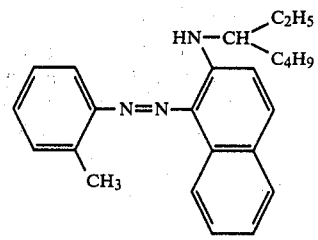

is obtained. It exhibits good solubilities in aromatic and aliphatic hydrocarbons and is very suitable for coloring motor fuels, fuel oils, surface coatings, waxes and fats.

EXAMPLE 81

10.7 parts of 2-methyl-1-aminobenzene is reacted with 34.1 parts of 2-(N-tridecyl)-naphthylamine as described in Example 79. A red dye of the formula:

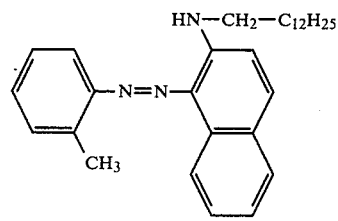

is obtained having similar properties. The yield is 43 parts.

EXAMPLE 82

13.5 parts of 3-propyl-1-aminobenzene is reacted with 34.1 parts of 2-(N-tridecyl)-naphthylamine as described in Example 79. The dye formed, which has the formula:

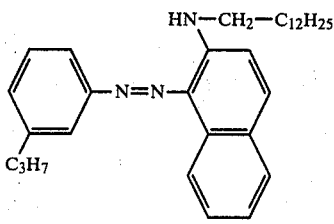

has properties similar to those of the compounds in the foregoing Examples.

EXAMPLE 83

10.7 parts of 2-methyl-1-aminobenzene is reacted with 25.3 parts of 2-(N-3-heptyl)-naphthylamine as described in Example 79 to give the dye of the formula:

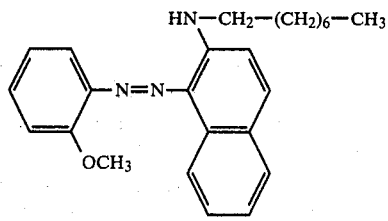

36 parts of the dye is obtained in the form of a red oil.

EXAMPLE 84

A compound of the formula:

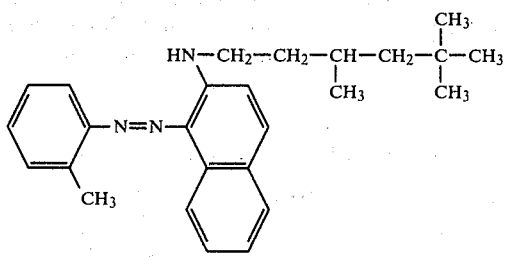

having similar properties is obtained in a yield of 40 parts from 12.3 parts of 2-methoxy-1-aminobenzene and 26.7 parts of 2-(N-n-octyl)-naphthylamine as described in Example 79.

EXAMPLE 85

A dye of the formula:

is obtained in a yield of 37 parts from 10.7 parts of 2-methyl-1-aminobenzene and 28.2 parts of 2-(N-3,5,5- solution of 25.7 parts of 2-(N-R³)-naphthylamine in xylene to form a mixture of dyes of the composition:

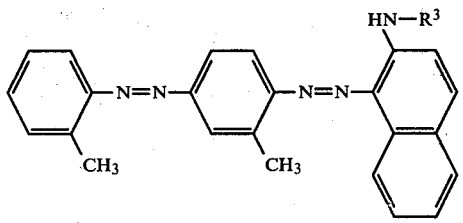

(with $R^3 =$ —(CH₂)₃—CH₃, —(CH₂)₃—O—CH₃ and

—(CH₂)₃—O—CH₂—CH—(CH₂)₃—CH₃
      |
      C₂H₅ in the molar ratio of 1:1:1).

EXAMPLE 75

22.5 parts of 4-amino-3,2′-dimethylazobenzene is diazotized and coupled as described in Example 60 with a solution of 25.7 parts of 2-(N-R³)-naphthylamine in xylene. The dye mixture of the composition:

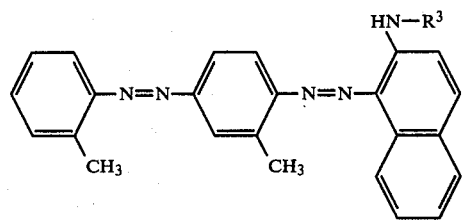

(with $R^3 =$ —(CH₂)₃—CH₃, —(CH₂)₃—O—CH₃,

—CH₂—CH—(CH₂)₃—CH₃ and
      |
      C₂H₅

—(CH₂)₃—O—CH₂—CH—(CH₂)₃—CH₃
              |
              C₂H₅ in the molar ratio of 1:1:1:1 formed dissolves well with a red coloration in aromatic and aliphatic hydrocarbons and is suitable for coloring motor fuels, fuel oils, surface coatings, waxes and fats.

EXAMPLE 76

A diazonium salt from 22.5 parts of 4-amino-3,2′-dimethylazobenzene is coupled as described in Example 60 with a solution of 27.6 parts of 1-(N-R³)-naphtyhlamine in xylene to give a dye of the composition:

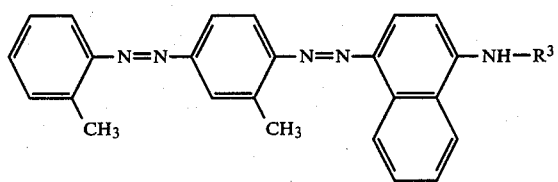

with $R^3 =$ —(CH₂)₃—CH₃, —(CH₂)₃—CH—CH₃,
                              |
                              CH₃

—(CH₂)₃—O—CH₃, —CH₂—CH—(CH₂)₃—CH₃ and
                      |
                      C₂H₄

—(CH₂)₃—O—CH₂—CH—(CH₂)₃—CH₃
              |
              C₂H₅ in a molar ratio of 1:1:1:1:1. The yield is 50 parts of a red oil.

EXAMPLE 77

22.5 parts of 4-amino-3,2′-dimethylazobenzene is reacted as described in Example 60 with 33.5 parts of 1-(N-R³)-naphthylamine. A mixture of dyes of the composition:

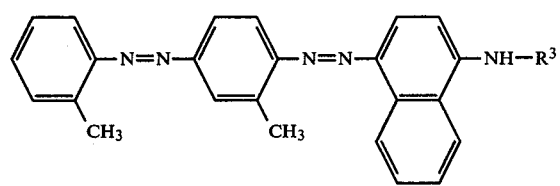

with $R^3 =$ —CH₂—C₁₂H₂₅ and

—(CH₂)₃—O—CH₂—CH—(CH₂)₃—CH₃
              |
              C₂H₅ in a molar ratio of 1:1 results.

EXAMPLE 78

19.7 parts of 4-aminoazobenzene is reacted with 32 parts of 2-(N-R³)-naphthylamine as described in Example 60 to form a mixture of dyes of the formula:

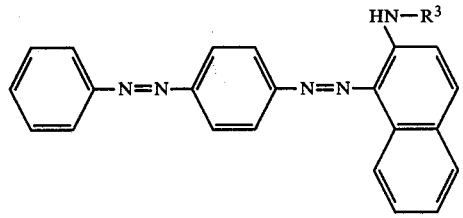

with $R^3 =$ —CH₂—CH—(CH₂)₃—CH₃, —CH₂—C₁₂H₂₅
        |
        C₂H₅ and —(CH₂)₃—O—CH₂—CH—(CH₂)₃—CH₃
                  |
                  C₂H₅ in a molar ratio of 1:1:1. The yield is 51 parts.

EXAMPLE 79

9.3 parts of aniline is dissolved in a mixture of 100 parts of water and 25 parts of 10 N hydrochloric acid at ambient temperature and 100 parts of ice is added followed by a concentrated aqueous solution of 6.9 parts of trimethylhexyl)-naphthylamine by the method of Example 79.

EXAMPLE 86

A dye of the formula:

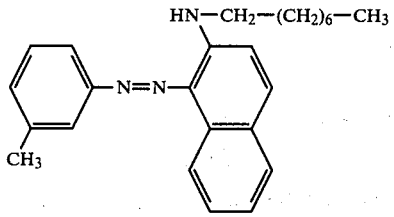

with similar properties is obtained in a yield of 37 parts by reaction of 10.7 parts of 3-methyl-1-aminobenzene with 26.7 parts of 1-(N-n-octyl)-naphthylamine according to Example 79.

EXAMPLE 87

10.7 parts of 2-methyl-1-aminobenzene is diazotized as described in Example 79. The solution of the diazonium salt is freed from nitrite and adjusted to pH 5 with sodium acetate. A solution of 13.4 parts of 2-(N-2-ethylhexyl)-naphthylamine and 17.0 parts of 2-(N-tridecyl)-naphthylamine in 100 parts of toluene is dripped in. The coupling is over after stirring overnight. The mixture is neutralized with dilute caustic soda solution. The aqueous phase is separated and the xylene is distilled off from the dye solution. 38 parts of a red oily mixture of two dyes of the formulae:

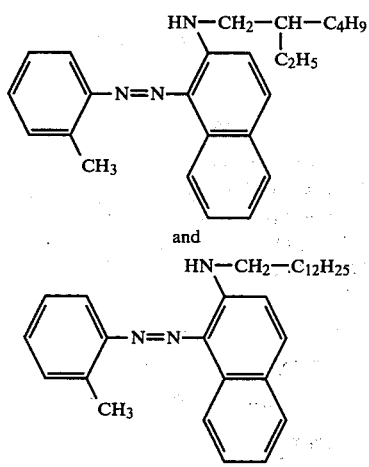

is obtained which dissolves well in aromatic and aliphatic hydrocarbons. These solutions have unlimited stability in storage at temperatures of −20° C. and are ready for use in identifying mineral oil products.

EXAMPLE 88

9.3 parts of aniline is diazotized as described and then coupled with a mixture of 13.4 parts of 2-(N-2-ethylhexyl)-naphthylamine and 12.6 parts of 2-(N-3-heptyl)-naphthylamine by the method of Example 87 to give a dye mixture of the formulae:

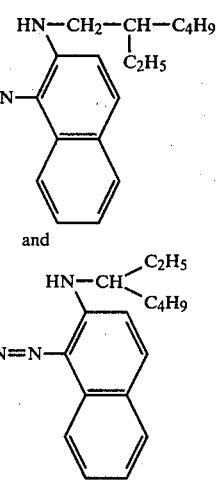

The yield is 34 parts of a red oil.

EXAMPLE 89

9.3 parts of aniline is diazotized as described in Example 79 and then coupled with a mixture of 13.4 parts of 2-(N-2-ethylhexyl)-naphthylamine and 13.4 parts of 2-(N-n-octyl)-naphthylamine to give the dye mixture of the formulae:

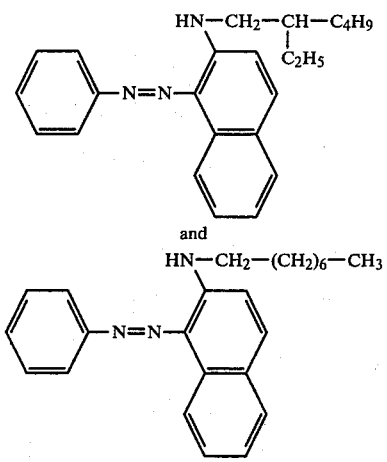

The yield is 36 parts of a red oil.

EXAMPLE 90

4.65 parts of aniline and 5.35 parts of 3-methyl-1-aminobenzene are diazotized together as described in Example 79 and then reacted with a solution of 26.7 parts of 2-(N-β-ethylhexyl)-naphthylamine in 100 parts of toluene to give the following dye mixture:

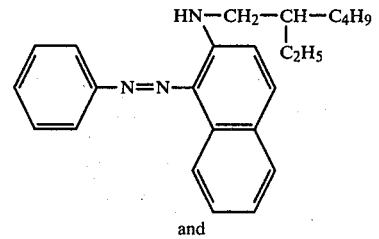

and

-continued

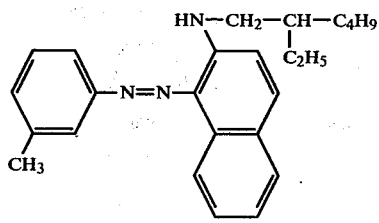

The yield is 36 parts of a red oil.

EXAMPLE 91

A diazonium salt mixture from 4.65 parts of aniline and 5.35 parts of 2-methyl-1-aminobenzene is reacted according to Example 79 with a solution of 34.0 parts of 2-(N-tridecyl)-naphthylamine in xylene. A red oil of the following composition is obtained:

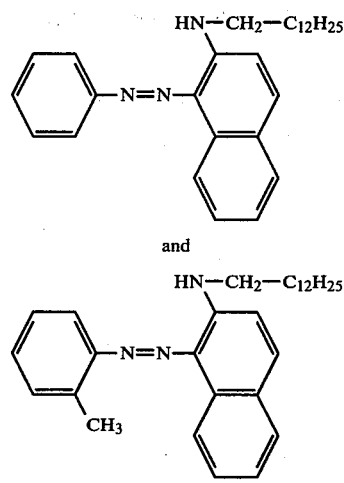

The yield is 42 parts.

EXAMPLE 92

A diazonium salt mixture from 4.65 parts of aniline and 5.35 parts of 2-methyl-1-aminobenzene is coupled as described in Example 79 with a solution of 25.3 parts of 2-(N-3-heptyl)-naphthylamine in xylene. A red oil is obtained with a composition represented by the formulae:

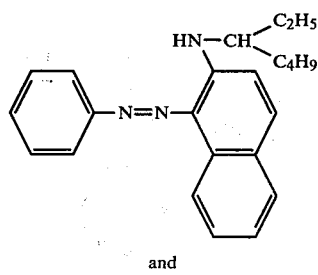

and

-continued

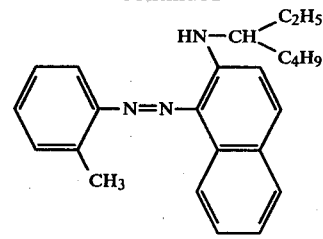

The yield is 35 parts.

EXAMPLE 93

A diazonium salt mixture of the same composition as in Example 91 is coupled with a solution of 26.7 parts of 2-(N-n-octyl)-napthylamine in a high boiling point mixture of aromatic hydrocarbons (boiling range from 180° to 220° C.) as described in Example 79. The dye formed in solution has the formulae:

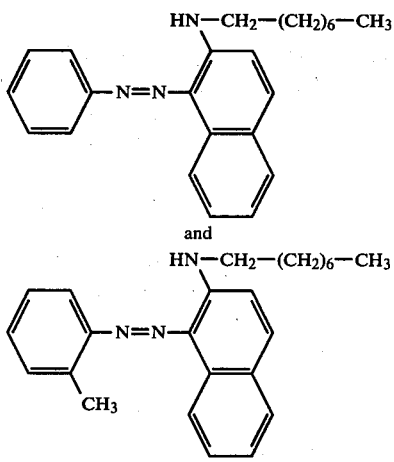

EXAMPLE 94

5.35 parts of 2-methyl-1-aminobenzene and 5.35 parts of 3-methyl-1-aminobenzene are reacted as described in Example 79 with 26.7 parts of 2-(N-2-ethylhexyl)-naphthylamine to form a dye mixture of the following formulae:

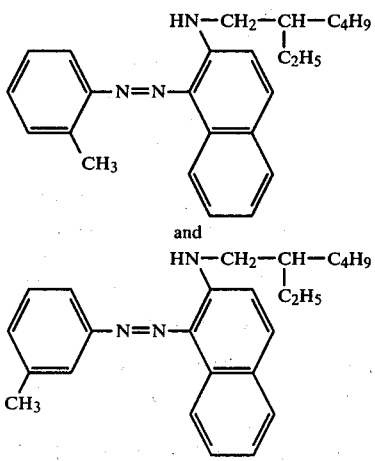

The yield is 36 parts of a red oil.

EXAMPLE 95

A mixture of 4.65 parts of aniline and 5.35 parts of 3-methyl-1-aminobenzene is diazotized as described in Example 79. Then a solution of 13.4 parts of 2-(N-2-ethylhexyl)-naphthylamine and 17.0 parts of 2-(N-tridecyl)-naphthylamine in 100 parts of xylene is dripped into the solution of the acetic diazonium salt which is devoid of nitrite. The coupling is over after stirring overnighgt. The mixture is made neutral with dilute caustic soda solution. The aqueous phase is separated and the xylene is distilled off from the dye solution. 38 parts of a red oil is obtained which consists of the following dyes:

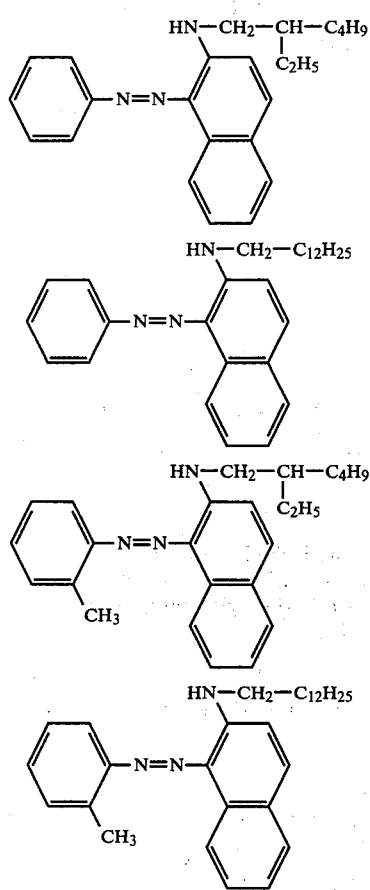

It has unlimited solubility in aromatic and aliphatic hydrocarbons and can be used for coloring motor fuels, fuel oils, surface coatings, waxes and fats.

EXAMPLE 96

5.35 parts of 2-methyl-1-aminobenzene and 5.35 parts of 3-methyl-1-aminobenzene are diazotized together as described in Example 79 and then reacted with a solution of 13.4 parts of 2-(N-2-ethylhexyl)-naphthylamine and 12.6 parts of 2-(N-3-heptyl)-naphthylamine to give the following mixture of dyes having similar properties:

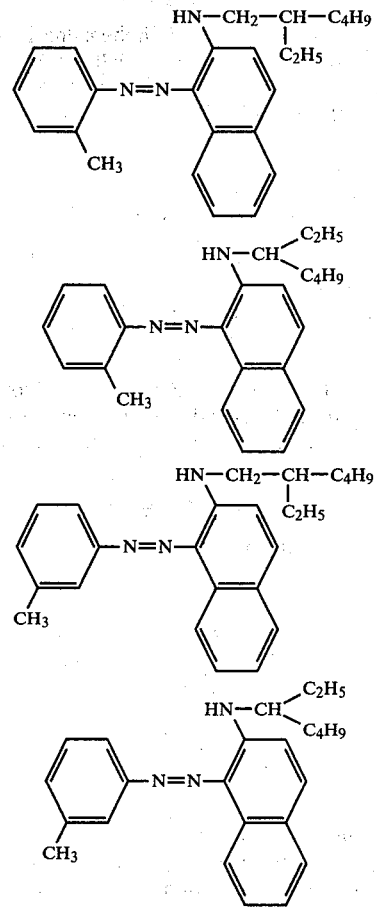

EXAMPLE 97

9.3 parts of aniline is dissolved at ambient temperature in a mixture of 100 parts of water and 25 parts of 10 N hydrochloric acid. 100 parts of ice is added. Then a concentrated aqueous solution of 6.9 parts of sodium nitrite is added. Diazotization is over within thirty mnutes at 0° to 5° C. The excess of nitrite is removed as usual with sulfamic acid and a pH of 5.0 is set up with sodium acetate. A solution of 26.7 parts of 1-(N-2-ethylhexyl)-naphthylamine in 100 parts of xylene is then dripped into the solution of the diazonium salt at 10° to 15° C. with intense stirring. After stirring overnight at 15° to 20° C. the coupling is complete. The mixture is neutralized with dilute caustic soda solution and the aqueous phase is separated. The xylene is distilled off. 36 parts of a red oil is obtained having the formula:

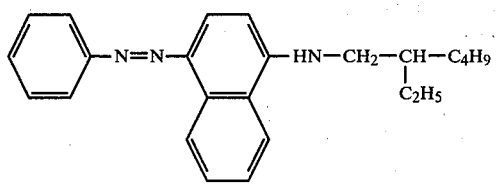

It is easily soluble in aromatic and aliphatic hydrocarbons and is very suitable for coloring motor fuels, fuel oils, surface coatings, waxes and fats.

EXAMPLE 98

10.7 parts of 2-methyl-1-aminobenzene is diazotized as described in Example 97 and then coupled with 26.7 parts of 1-(N-2-ethylhexyl)-naphthylamine. A red waxy compound of the formula:

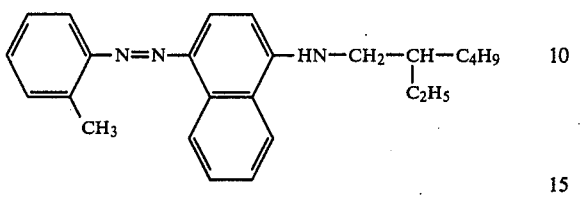

is obtained. It has good solubilities in aromatic and aliphatic hydrocarbons and is well suited to the coloring of motor fuels, fuel oils, surface coatings, waxes and fats.

EXAMPLE 99

36 parts of a red dye of the formula:

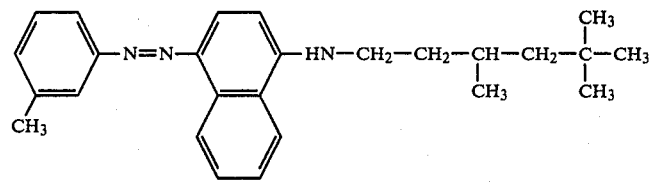

having similar properties is obtained from 10.7 parts of 3-methyl-1-aminobenzene and 28.2 parts of 1-(N-3,5,5-trimethylhexyl)-naphthylamine by the method of Example 97.

EXAMPLE 100

A red dye of the formula:

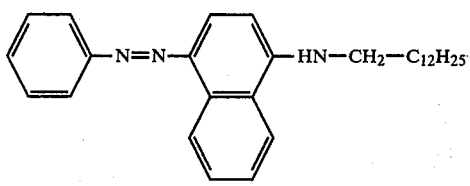

having similar properties is obtained in a yield of 41 parts from 9.3 parts of aniline and 34.1 parts of 1-(N-tridecyl)-naphthylamine by the method of Example 97.

EXAMPLE 101

10.7 parts of 3-methyl-1-aminobenzene is reacted with 34.1 parts of 1-(N-tridecyl)-naphthylamine by the method of Example 97. The dye formed which has the formula:

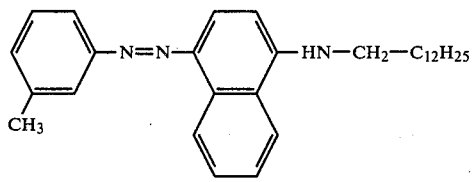

has properties similar to those of the compounds of the foregoing Examples.

EXAMPLE 102

9.3 parts of aniline is reacted with 25.3 parts of 1-(N-3-heptyl)-naphthylamine according to Example 97 to form the dye of the formula:

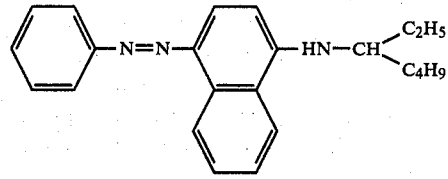

34 parts of the dye is obtained; it is of waxy consistency.

EXAMPLE 103

A dye of the formula:

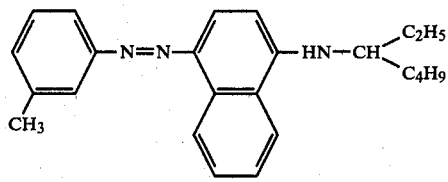

is obtained with similar properties in a yield of 34 parts from 10.7 parts of 3-methyl-1-aminobenzene and 25.3 parts of 1-(N-3-heptyl)-naphthylamine according to Example 97.

EXAMPLE 104

35 parts of a dye of the formula:

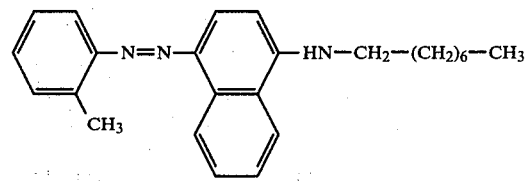

is obtained from 10.7 parts of 2-methyl-1-aminobenzene and 26.7 parts of 1-(N-n-octyl)-naphthylamine by the method of Example 97.

EXAMPLE 105

10.7 parts of 2-methyl-1-aminobenzene is diazotized as described in Example 97. A solution of 13.4 parts of 1-(N-2-ethylhexyl)-naphthylamine and 17.0 parts of 1-(N-tridecyl)-naphthylamine in 100 parts of toluene is then dripped into the acetic acid solution of the diazonium salt which is devoid of nitrite. The coupling reaction is complete after stirring overnight. The mixture is neutralized with dilute caustic soda solution. The aqueous phase is separated and the toluene is distilled off from the dye solution. 38 parts of a red oily mixture of two dyes of the formulae:

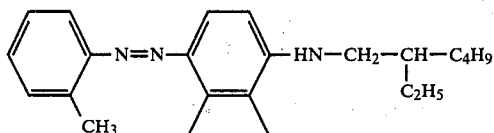

and

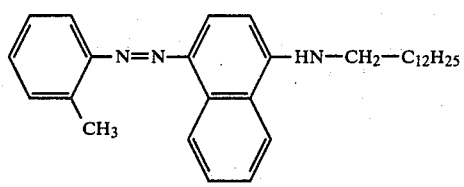

is obtained which dissolves well in aromatic and aliphatic hydrocarbons. These solutions have unlimited stability in storage at temperatures of $-20°$ C. and are ready for use as agents for marking mineral oil products.

EXAMPLE 106

9.3 parts of aniline is diazotized as described and then coupled with 13.4 parts of 1-(N-2-ethylhexyl)-naphthylamine and 12.6 parts of 1-(N-3-heptyl)-naphthylamine as described in Example 105 to form a mixture of the dyes having the formulae:

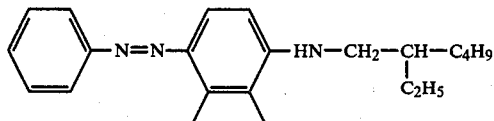

and

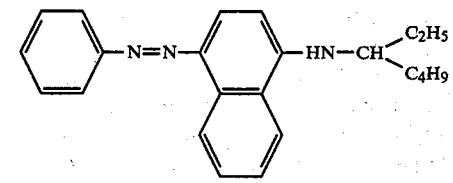

The yield is 35 parts of a red waxy substance.

EXAMPLE 107

10.7 parts of 2-methyl-1-aminobenzene is diazotized as described in Example 97 and then converted into a mixture of dyes of the formulae:

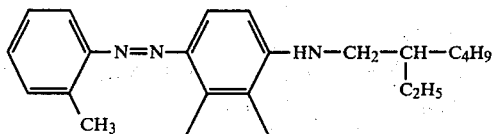

and

-continued

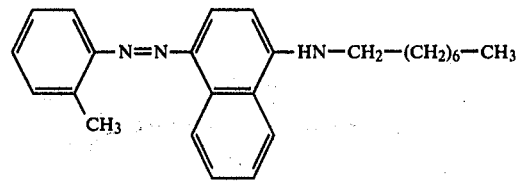

having similar properties. The yield is 40 parts.

EXAMPLE 108

4.65 parts of aniline and 5.35 parts of 3-methyl-1-aminobenzene are diazotized together as described in Example 97 and then reacted with a solution of 26.7 parts of 1-(N-$\beta$-ethylhexyl)-naphthylamine in 100 parts of toluene to form the following mixture of dyes:

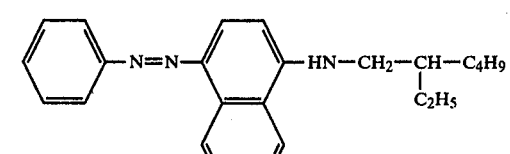

and

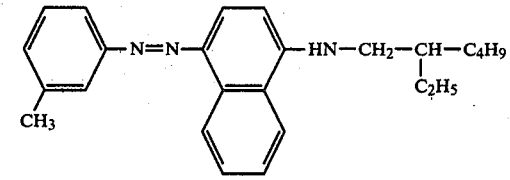

The yield is 38 parts of a red oil.

EXAMPLE 109

A diazonium salt mixtures from 4.65 parts of aniline and 5.35 parts of 2-methyl-1-aminobenzene is reacted with a solution of 34.0 parts of 1-(N-tridecyl)-naphthylamine in xylene according to Example 97. A red oil is obtained in a yield of 42 parts. It has the following composition:

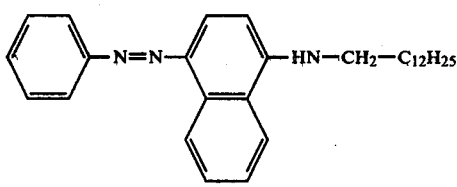

and

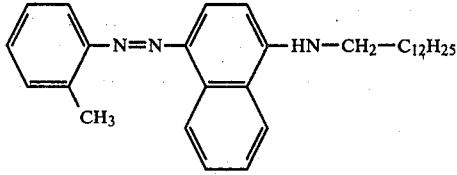

EXAMPLE 110

A diazonium salt mixture from 4.65 parts of aniline and 5.35 parts of 2-methyl-1-aminobenzene is coupled as described in Example 97 with a solution of 2.53 parts of 1-(N-3-heptyl)-naphthylamine in xylene. A red oil is obtained having a composition corresponding to the formulae:

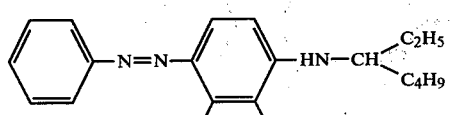

and

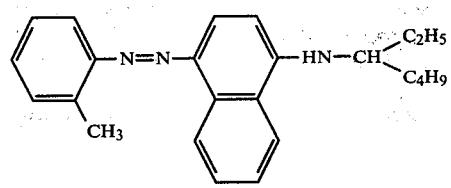

The yield is 35 parts.

EXAMPLE 111

A diazonium salt mixture of the same composition as in Example 91 is coupled as described in Example 97 with a solution of 26.7 parts of 1-(N-n-octyl)-naphthylamine in a high boiling point mixture of aromatic hydrocarbons (boiling point range from 180° to 220° C.). The dyes formed in solution have the formulae:

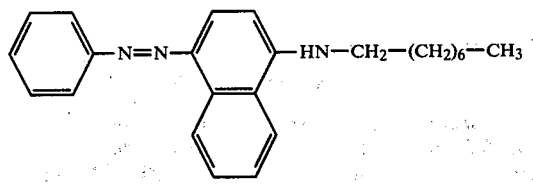

and

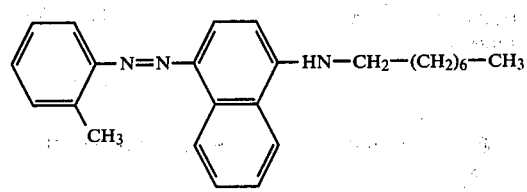

EXAMPLE 112

5.35 parts of 2-methyl-1-aminobenzene and 5.35 parts of 3-methyl-1-aminobenzene are reacted with 26.7 parts of 1-(N-2-ethylhexyl)-naphthylamine as described in Example 97 to form the following mixture of dyes:

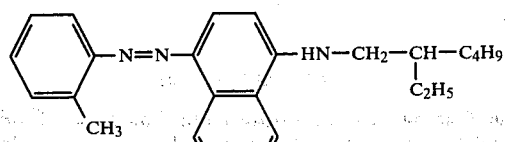

and

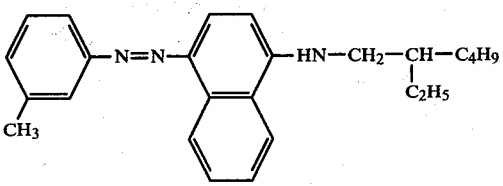

The yield is 38 parts of a red oil.

EXAMPLE 113

The diazonium salt mixture of Example 112 is coupled as described in Example 97 with 34.1 parts of 1-(N-tridecyl)-naphthylamine. A red oil of similar properties and having the following composition is obtained in a yield of 43 parts:

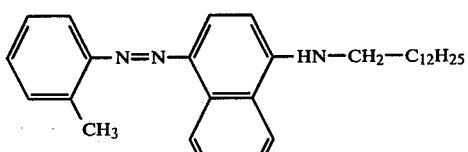

and

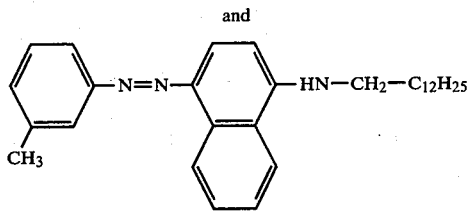

EXAMPLE 114

A mixture of 4.65 parts of aniline and 5.35 parts of 1-methyl-1-aminobenzene is diazotized as described in Example 97. A solution of 13.4 parts of 1-(N-2-ethylhexyl)-naphthylamine and 17.0 parts of 1-(N-tridecyl)-naphthylamine in 100 parts of xylene is dripped into the acetic acid solution of the diazonium salt which has been freed from nitrite. The coupling is complete after stirring overnight. The mixture is neutralized with dilute caustic soda solution. The aqueous phase is separated and the xylene is distilled off from the dye solution. 38 parts of a red oil is obtained which consists of the following dyes:

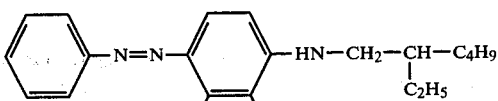

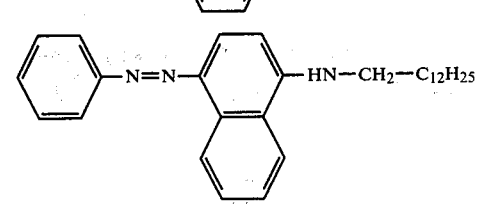

-continued

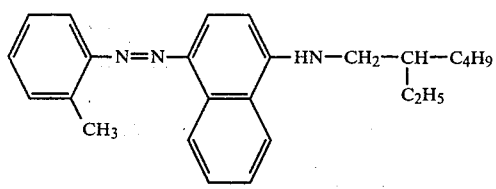

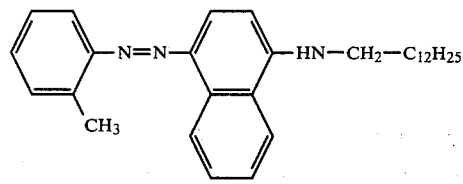

It has unlimited solubility in aromatic and aliphatic hydrocarbons with a red coloration and can be used for coloring motor fuels, fuel oils, surface coatings, waxes and fats.

EXAMPLE 115

A mixed diazonium salt prepared as described in Example 114 is coupled with a solution of 13.4 parts of 1-(N-2-ethylhexyl)-naphthylamine and 13.4 parts of 1-(N-n-octyl)-naphthylamine in xylene. A mixture similar in its properties is obtained which consists of the following dyes:

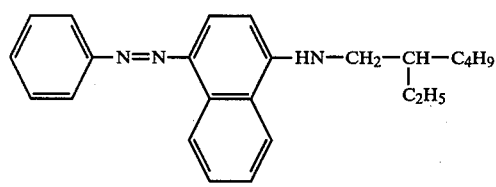

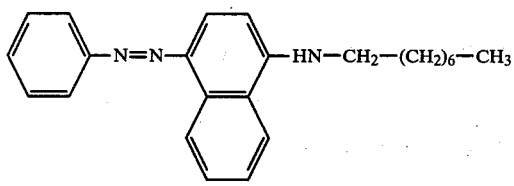

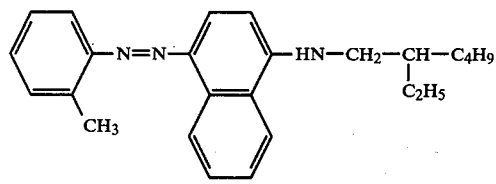

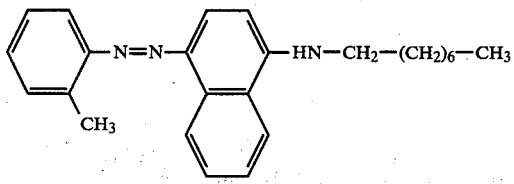

EXAMPLE 116

5.35 parts of 2-methyl-1-aminobenzene and 5.35 parts of 3-methyl-1-aminobenzene are diazotized together as described in Example 97 and then reacted with a solution of 13.4 parts of 1-(N-2-ethylhexyl)-naphthylamine and 12.6 parts of 1-(N-3-heptyl)-naphthylamine to give the following dye mixture having similar properties:

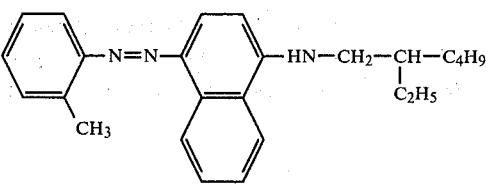

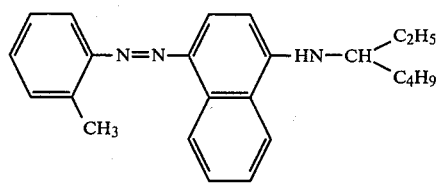

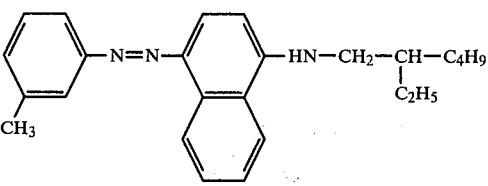

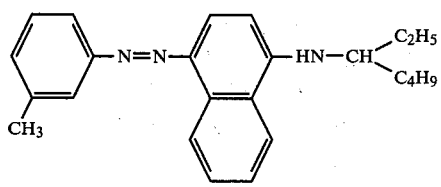

EXAMPLE 117

9.3 parts of aniline is dissolved in a mixture of 100 parts of water and 25 parts of 10N hydrochloric acid at ambient temperature. 100 parts of ice is added followed by a concentrated aqueous solution of 6.9 parts of sodium nitrite. Diazotization is complete after thirty minutes at 0° to 5° C. The excess of nitrite is removed with sulfamic acid and a pH of 5.0 is set up with sodium acetate. A solution of 23.5 parts of 2-(N-cyclohexyl)-naphthylamine in 50 parts of glacial acetic acid is then dripped into the solution of the diazonium salt with intense stirring. Coupling is complete after stirring overnight. The diazo dye separates in a form in which it can be easily filtered. It is filtered off and washed with water until it is neutral and free from salts, and dried invacuo at 60° C. 32 parts of red powder of the dye of the formula:

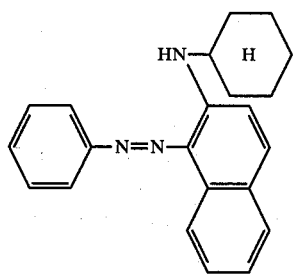

is obtained which is suitable for coloring oils, fats, waxes and motor fuels.

EXAMPLE 118

10.7 parts of 2-methyl-1-aminobenzene is diazotized as described in Example 117 and then coupled with 23.5 parts of 2-(N-cyclohexyl)-naphthylamine. 33 parts of the dye of the formula:

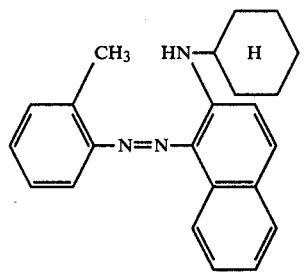

is obtained as a red powder.

EXAMPLE 119

12.3 parts of 3,6-dimethyl-1-aminobenzene is reacted with 23.5 parts of 1-(N-cyclohexyl)-naphthylamine as described in Example 117. A red dye having similar properties is obtained in a yield of 35 parts; it has the formula:

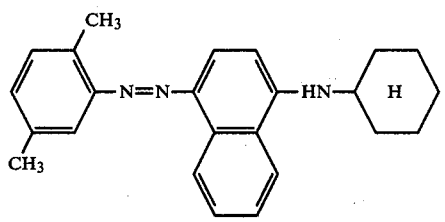

EXAMPLE 120

A red dye of the formula:

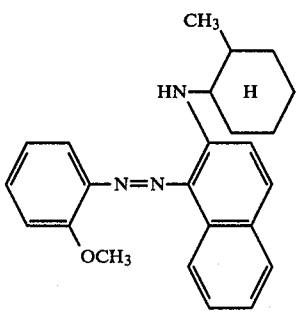

is obtained in a yield of 37 parts from 12.3 parts of 2-methoxy-1-aminobenzene and 25 parts of 2-(N-2'-methylcyclohexyl)-naphthylamine as described in Example 117.

EXAMPLE 121

A red dye of the formula:

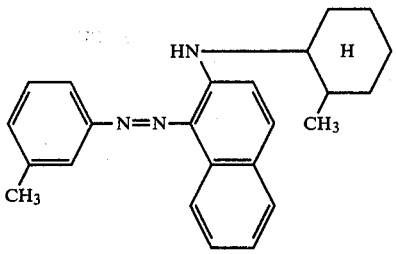

having similar properties is obtained by reaction of 10.7 parts of 3-methyl-1-aminobenzene with 25 parts of 2-(N-2'-methylcyclohexyl)-naphthylamine as described in Example 117.

EXAMPLE 122

13.7 parts of 3-methyl-6-methoxy-1-aminobenzene is reacted with 25 parts of 1-(N-2'-methylcyclohexyl)-naphthylamine as described in Example 117 to form the dye of the formula:

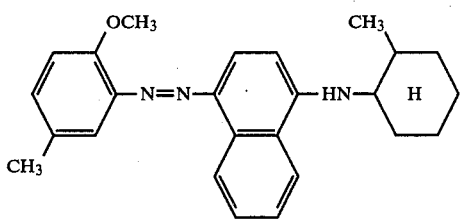

in a yield of 37 parts as a red powder.

EXAMPLE 123

A red dye of the formula:

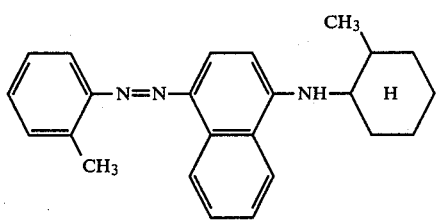

is obtained in a yield of 45 parts by the reaction of the diazonium salt from 10.7 parts of 2-methyl-1-aminobenzene and 25 parts of 1-(N-2'-methylcyclohexyl)-naphthylamine as described in Example 117.

EXAMPLE 124

9.3 parts of aniline is reacted with 23.0 parts of 2-(N-phenyl)-naphthylamine as described in Example 117. 41 parts of a red powder of the dye of the formula:

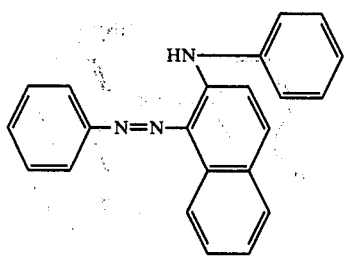

is obtained in a yield of 40 parts.

EXAMPLE 125

A red dye having the formula:

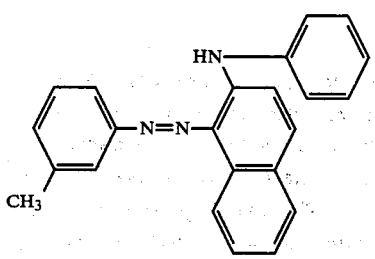

is obtained in a yield of 43 parts from 10.7 parts of 3-methyl-1-aminobenzene and 23.0 parts of 2-(N-phenyl)-naphthylamine as described in Example 117.

EXAMPLE 126

10.7 parts of 2-methyl-1-aminobenzene is reacted with 23 parts of 1-(N-phenyl)-naphthylamine as described in Example 117. The dye formed has the formula:

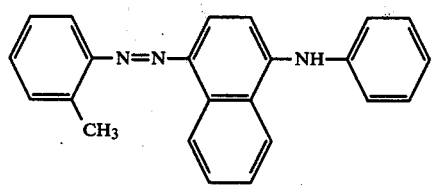

and has properties similar to those of the compounds in the foregoing Examples.

EXAMPLE 127

A dye of the formula:

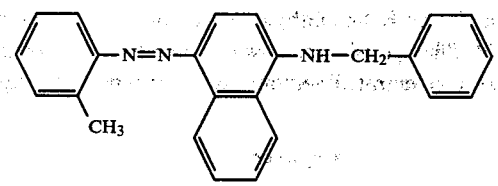

is obtained in a yield of 34 parts from 10.7 parts of 2-methyl-1-aminobenzene and 24.5 parts of 1-(N-benzyl)-naphthylamine as described in Example 117.

EXAMPLE 128

9.3 parts of aniline is diazotized as described in Example 117 and coupled with 24.5 parts of 2-(N-benzyl)-naphthylamine. A red dye of the formula:

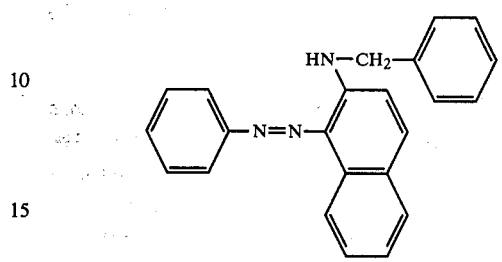

is obtained which has properties similar to those of the compounds in the foregoing Examples.

EXAMPLE 129

A red dye of the formula:

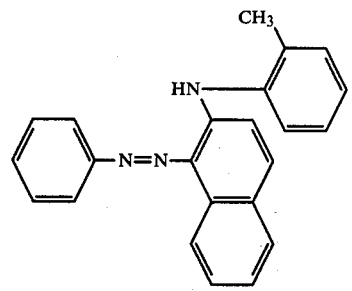

is obtained in a yield of 32 parts by coupling the diazonium salt from 9.3 parts of aniline with 24.5 parts of 2-(N-2'-methylphenyl)-naphthylamine as described in Example 117.

EXAMPLE 130

12.1 parts of 2-ethoxy-1-aminobenzene is diazotized as described and then coupled as described in Example 117 with 24.5 parts of 1-(N-2'-methylphenyl)-naphthylamine to form a red dye of the formula:

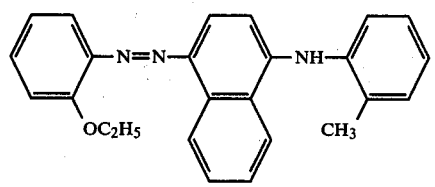

in a yield of 36 parts.

EXAMPLE 131

9.3 parts of aniline is dissolved at ambient temperature in a mixture of 100 parts of water and 25 parts of 10N hydrochloric acid. 100 parts of ice is added followed by a concentrated aqueous solution of 6.9 parts of sodium nitrite. Diazotization is finished after 30 minutes at 0° to 5° C. The excess of nitrite is then removed as usual with sulfamic acid and a pH of 5.0 is set up with sodium acetate. A solution of 29.8 parts of 2-(N-$R^3$)-naphthylamine (with $$R^3 = -CH_2-CH(C_2H_5)-(CH_2)_3-CH_3 \text{ and}$$

$$-(CH_2)_3-O-CH_2-CH(C_2H_5)-(CH_2)_3-CH_3$$

in a molar ratio of 1:1) in 100 parts of xylene is then dripped in at from 10° to 15° with intense stirring. The whole is then neutralized with dilute caustic soda solution and the aqueous phase is separated. The xylene is distilled off. 38 parts of a red oil is obtained which consists of a mixture of dyes of the formula:

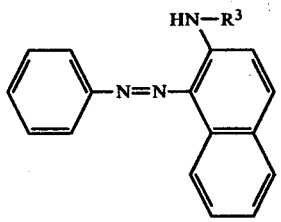

(with $R^3$ having the said meanings). The mixture is miscible in all proportions with aromatic and aliphatic solvents and is suitable for coloring motor fuels, fuel oils, surface coatings, waxes and fats.

EXAMPLE 132

10.7 parts of 2-methyl-1-aminobenzene is diazotized as described in Example 131 and then coupled with 29.8 parts of 1-(N-R$^3$)-naphthylamine (R$^3$ having the meanings given below). 43 parts of a red oil is obtained which consists of compounds of the following formula:

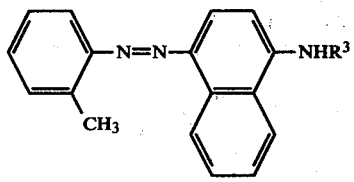

(with $$R^3 = -CH_2-CH(C_2H_5)-(CH_2)_3-CH_3 \text{ and}$$

$$-(CH_2)_3-O-CH_2-CH(C_2H_5)-(CH_2)_3-CH_3$$

in a molar ratio 1:1). It has good solubility in aromatic and aliphatic hydrocarbons and is suitable for coloring motor fuels, fuel oils, surface coatings, waxes and fats.

EXAMPLE 133

43 parts of a mixture of red dyes of the formula:

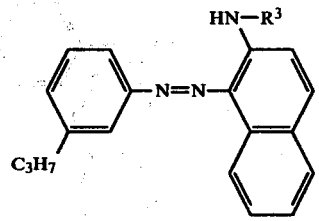

(with $$R^3 = -CH_2-CH(C_2H_5)-(CH_2)_3-CH_3 \text{ and}$$

$$-(CH_2)_3-O-CH_2-CH(C_2H_5)-(CH_2)_3-CH_3$$

in a molar ratio of 1:1) is obtained from 13.5 parts of 3-propyl-1-aminobenzene and 29.8 parts of 2-(N-R$^3$)-naphthylamine according to the method described in Example 131. The mixture can easily be converted by dissolving it in 43 parts of xylene into a solution having a concentration of 50% which is ready for use and which is stable in storage.

EXAMPLE 134

39 parts of a dye mixture of the composition:

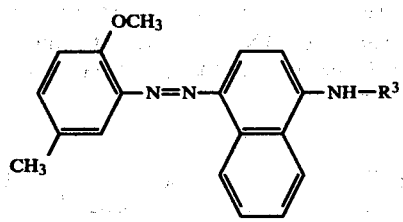

(with $$R^3 = -CH_2-CH(C_2H_5)-(CH_2)_3-CH_3 \text{ and}$$

$$-(CH_2)_3-O-CH_2-CH(C_2H_5)-(CH_2)_3-CH_3$$

in a molar ratio of 2:1) is obtained by the reaction of 13.7 parts of 3-methyl-6-methoxy-1aminobenzene with 28.7 parts of 1-(N-R$^3$)-naphthylamine as described in Example 79. The dye mixture may be converted into a ready-to-use concentrated solution as described in Example 133.

EXAMPLE 135

10.7 parts of 2-methyl-1-aminobenzene is reacted as described in Example 131 with 28 parts of 2-(N-R$^3$)-naphthylamine. 40 parts of a dye mixture is obtained in the form of a red oil. It has the composition:

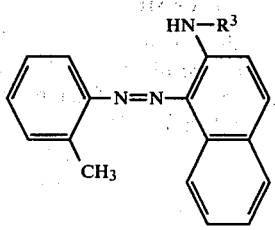

(with

R³ = —CH₂—CH—(CH₂)₃—CH₃ and
         |
         C₂H₅

—(CH₂)₃—O—CH₂—CH—(CH₂)₃—CH₃
                |
                C₂H₅ in a molar ratio of 3:1).

EXAMPLE 136

9.3 parts of aniline is diazotized as described in Example 131. A solution of 24.6 parts of 2-(N-R³)-naphthylamine in 100 parts of toluene is then dripped into the acetic acid solution of the diazonium salt which is devoid of nitrite. The coupling reaction is complete after stirring overnight. The whole is neutralized with dilute caustic soda solution. The aqueous phase is separated. The toluene is distilled off. 34 parts of an oily red mixture of two dyes having the formula:

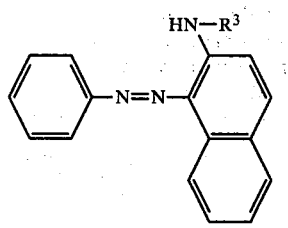

(with

R³ = —CH₂—CH—(CH₂)₃—CH₃ and —(CH₂)₃—O—CH₃)
         |
         C₂H₅ is obtained.

EXAMPLE 137

9.3 parts of aniline is diazotized as described in Example 79 and then reacted with 25.4 parts of 2-(N-R³)-naphthylamine as described in Example 136 to give a mixture of dyes of the formula:

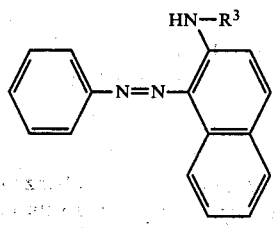

(with

R³ = —CH₂—CH—(CH₂)₃—CH₃ and —(CH₂)₃—O—C₂H₅
         |
         C₂H₅ is a molar ratio of 1:1). The mixture has properties similar to those of the mixture of Example 136. The yield is 34 parts.

EXAMPLE 138

13.7 parts of 2-ethoxy-1-aminobenzene is diazotized as described in Example 136 and then coupled with 26.3 parts of 2-(N-R³)-naphthylamine to give a mixture of dyes of the formula:

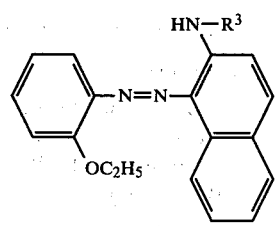

(with

R³ = —(CH₂)₃—CH₃ and —(CH₂)₃—O—CH—(CH₂)₃—CH₃
                                    |
                                    C₂H₅ in the molar ratio 1:1). The yield is 40 parts.

EXAMPLE 139

The diazonium salt from 10.7 parts of 2-methyl-1-aminobenzene is reacted as described in Example 136 with a solution of 26.2 parts of 1-(N-R³)-naphthylamine in toluene. A mixture of dyes having the composition:

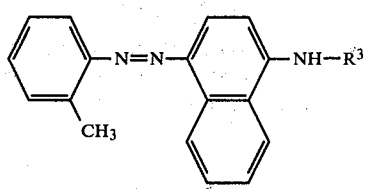

(with

R³ = —(CH₂)₃—CH₃ and —(CH₂)₃—O—CH—(CH₂)₃—CH₃
                                    |
                                    C₂H₅ in the molar ratio 1:1) is obtained. The yield is 35 parts.

EXAMPLE 140

9.3 parts of aniline is diazotized and reacted as described in Example 136 with a solution of 27.5 parts of 2-(N-R³)-naphthylamine in toluene. A mixture of dyes of the formula:

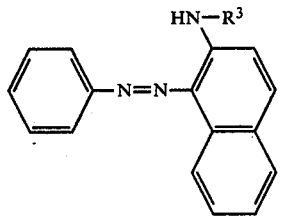

(with

R$^3$ = —(CH$_2$)$_3$—O—CH$_3$ and

—(CH$_2$)$_3$—O—CH$_2$—CH—(CH$_2$)$_3$—CH$_3$
　　　　　　　　　|
　　　　　　　　C$_2$H$_5$ in the molar ratio 1:1) is obtained. The yield is 35 parts.

EXAMPLE 141

10.7 parts of 3-methyl-1-aminobenzene is diazotized as described and then coupled as described in Example 136 with 27.5 parts of 1-(N-R$^3$)-naphthylamine to give a mixture of dyes of the formula:

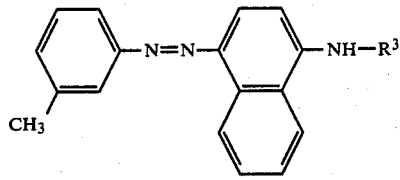

(with

R$^3$ = —(CH$_2$)$_3$—O—CH$_3$ and

—(CH$_2$)$_3$—O—CH$_2$—CH—(CH$_2$)$_3$—CH$_3$
　　　　　　　　　|
　　　　　　　　C$_2$H$_5$ in a molar ratio of 1:1). The yield is 36 parts of a red oil.

EXAMPLE 142

9.3 parts of aniline is diazotized and then reacted with 28.5 parts of 2-(N-R$^3$)-naphthylamine as described in Example 136 to give a mixture of dyes of the formula:

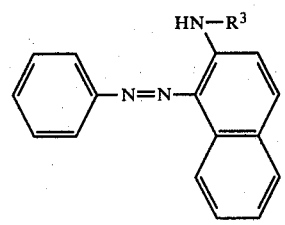

(with

R$^3$ = —(CH$_2$)$_3$—O—C$_2$H$_5$ and

—(CH$_2$)$_3$—O—CH$_2$—CH—(CH$_2$)$_3$—CH$_3$
　　　　　　　　　|
　　　　　　　　C$_2$H$_5$ in the molar ratio 1:1). The yield is 37 parts of a red oil.

EXAMPLE 143

9.3 parts of aniline is diazotized by a conventional method and then converted with 26.7 parts of 2-(N-R$^3$)-naphthylamine as described in Example 136 into a mixture of dyes of the formula:

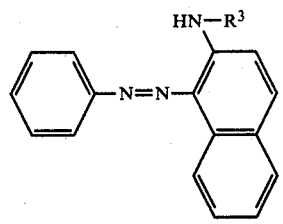

with

R$^3$ = —(CH$_2$)$_3$—CH$_3$, —CH$_2$—CH—(CH$_2$)$_3$—CH$_3$ and
　　　　　　　　　　　　　　　　|
　　　　　　　　　　　　　　　C$_2$H$_5$

—(CH$_2$)$_3$—O—CH$_2$—CH—(CH$_2$)$_3$—CH$_3$
　　　　　　　　　|
　　　　　　　　C$_2$H$_5$ in a molar ratio of 1:1:1.35 parts of a red oil is obtained which has unlimited solubility in aromatic and aliphatic hydrocarbons and which can be used for coloring motor fuels, fuel oils, surface coatings, waxes and fats.

EXAMPLE 144

The diazonium salt from 9.3 parts of aniline is coupled as described in Example 131 with a solution of 27.5 parts of 2-(N-R$^3$)-naphthylamine in a high boiling point mixture of aromatic hydrocarbons (boiling point range from 180° to 314° C.). A mixture of dyes having the composition represented by the formula:

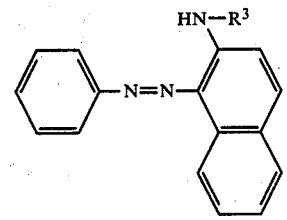

(with

R$^3$ = —CH$_2$—CH—(CH$_2$)$_3$—CH$_3$,
　　　　　　|
　　　　　C$_2$H$_5$

—(CH$_2$)$_3$—O—CH$_2$—CH—(CH$_2$)$_3$—CH$_3$ and
　　　　　　　　　|
　　　　　　　　C$_2$H$_5$

—(CH$_2$)$_3$—O—CH$_3$ in the molar ratio 1:1:1) is formed in the solution. The solution may be used immediately for coloring mineral oil products.

EXAMPLE 145

10.7 parts of 3-methyl-1-aminobenzene is reacted as described in Example 131 with a solution of 27.5 parts of 1-(N-R$^3$)-naphthylamine in xylene. A mixture of dyes of the composition:

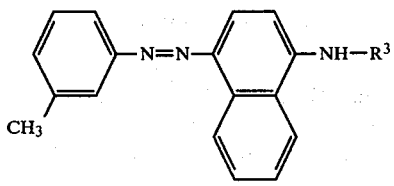

with $R^3 = -CH_2-CH-(CH_2)_3-CH_3,$
           $|$
          $C_2H_5$ $-(CH_2)_3-O-CH_2-CH-(CH_2)_3-CH_3$ and
                  $|$
                 $C_2H_5$ $-(CH_2)_3-O-CH_3$ in the molar ration 1:1:1 is obtained in the form of a red oil.

EXAMPLE 146

12.1 parts of 2,5-dimethyl-1-aminobenzene is diazotized as described and then coupled with 23.5 parts of 2-(N-R$^3$)-naphthylamine as described in Example 131. A dye mixture of the composition:

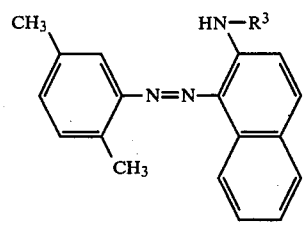

with $R^3 = -CH_2-CH-(CH_2)_3-CH_3, -(CH_2)_3-CH_3$ and
           $|$
          $C_2H_5$ $-(CH_2)_3-O-CH_3$ in a molar ratio of 1:1:1 is obtained. The yield is 35 parts.

EXAMPLE 147

33 parts of a red oil consisting of a mixture of dyes of the compositions:

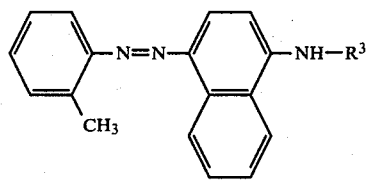

with $R^3 = -CH_2-CH-(CH_2)_3-CH_3, -(CH_2)_3-CH_3$ and
           $|$
          $C_2H_5$ $-(CH_2)_3-O-CH_3$ in the molar ratio 1:1:1 is obtained from 10.7 parts of 3-methyl-1-aminobenzene and 23.5 parts of 2-(N-R$^3$)-naphthylamine as described in Example 131.

EXAMPLE 148

34 parts of a red oil consisting of a mixture of compounds of the formula:

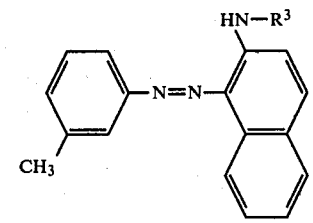

with $R^3 = -CH_2-CH-(CH_2)_3-CH_3, -(CH_2)_3-CH_3$ and
           $|$
          $C_2H_5$ $-(CH_2)_3-O-CH_3$ in the molar ratio 1:1:1 is obtained from 10.7 parts of 3-methyl-1-aminobenzene and 23.5 parts of 2-(N-R$^3$)-naphthylamine as described in Example 131.

EXAMPLE 149

9.3 parts of aniline is diazotized by a conventional method and coupled as described in Example 131 with a solution of 25.7 parts of 2-(N-R$^3$)-naphthylamine in xylene. A mixture of dyes of the compositions:

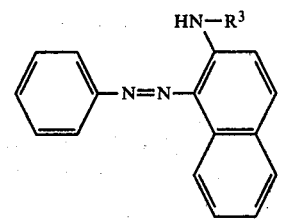

with $R^3 = -(CH_2)_3-CH_3, -(CH_2)_3-O-CH_3$ and $-(CH_2)_3-O-CH_2-CH-(CH_2)_3-CH_3$
                  $|$
                 $C_2H_5$ in the molar ratio 1:1:1 is obtained. The yield is 35 parts of a red oil.

EXAMPLE 150

10.7 parts of 3-methyl-1-aminobenzene and 25.7 parts of 1-(N-R$^3$)-naphthylamine are used in the method according to Example 131. A mixture of dyes of the composition:

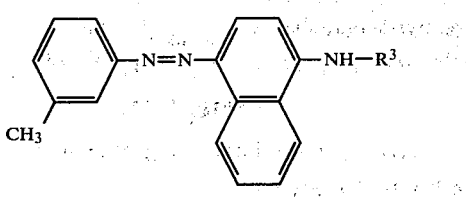

with $R^3 = -(CH_2)_3-CH_3, -(CH_2)_3-O-CH_3$ and
$-(CH_2)_3-O-CH_2-CH(C_2H_5)-(CH_2)_3-CH_3$ in the molar ratio 1:1:1 is obtained in the form of a red oil.

EXAMPLE 151

10.7 parts of 2-methyl-1-aminobenzene is diazotized and coupled as described in Example 131 with a solution of 25.7 parts of 2-(N-R³)-naphthylamine in xylene. The mixture of dyes of the composition:

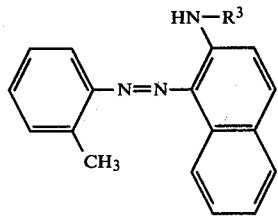

with $R^3 = -(CH_2)_3-CH_3, -(CH_2)_3-O-CH_3,$
$-CH_2-CH(C_2H_5)-(CH_2)_3-CH_3$ and
$-(CH_2)_3-O-CH_2-CH(C_2H_5)-(CH_2)_3-CH_3$ in the molar ratio 1:1:1 which is formed dissolves well with a red coloration in automatic and aliphatic hydrocarbons and is suitable for coloring motor fuels, fuel oils, surface coatings, waxes and fats.

EXAMPLE 152

9.3 parts of aniline is diaziotized as described and coupled with a solution of 27.6 parts of 2-(N-R³)-naphthylamine in a high boiling point mixture of aromatic hydrocarbons (boiling point range from 180° to 220° C.) as described in Example 131. The mixture of dyes formed which has the composition:

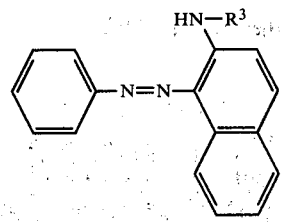

with $R^3 = -(CH_2)_3-CH_3, -(CH_2)_3-CH(CH_3)-CH_3,$
$-(CH_2)_3-O-CH_3-CH_2-CH(C_2H_5)-(CH_2)_3-CH_3$ and
$-(CH_2)_3-O-CH_2-CH(C_2H_5)-(CH_2)_3-CH_3$ in a molar ratio of 1:1:1:1:1 has properties similar to those of the mixtures of the foregoing Examples. The yield is 35 parts.

EXAMPLE 153

A diazonium salt from 12.1 parts of 2,6-dimethyl-1-aminobenzene is coupled as described in Example 131 with a solution of 27.6 parts of 1-(N-R³)-naphthylamine in xylene to give a dye of the composition:

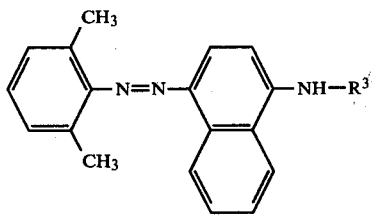

with $R^3 = -(CH_2)_3-CH_3, -(CH_2)_3-CH(CH_3)-CH_3,$
$-(CH_2)_3-O-CH_3-CH_2-CH(C_2H_5)-(CH_2)_3-CH_3$ and
$-(CH_2)_3-O-CH_2-CH(C_2H_5)-(CH_2)_3-CH_3$ in a molar ratio of 1:1:1:1:1. The yield is 39 parts of a red oil.

EXAMPLE 154

A mixture of compounds of the following composition:

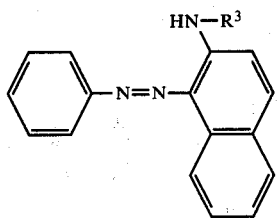

with $R^3 = -CH_2-C_{12}H_{25}$ and
$-(CH_2)_3-O-CH_2-CH(C_2H_5)-(CH_2)_3-CH_3$ in a molar ratio of 1:1 is obtained in a yield of 43 parts of a red oil by coupling the diazonium salt from 9.3 parts of aniline with a solution of 33.5 parts of 2-(N-R³)-naphthylamine in xylene.

EXAMPLE 155

10.7 parts of 2-methyl-1-aminobenzene is reacted as described in Example 131 with 33.5 parts of 1-(N-R³)-naphthylamine. A mixture of dyes of the composition:

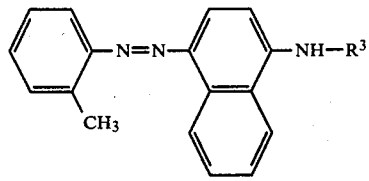

with

R³ = —CH₂—C₁₂H₂₅ and
—(CH₂)₃—O—CH₂—CH(C₂H₅)—(CH₂)₃—CH₃ in a molar ratio of 1:1 is obtained.

EXAMPLE 156

9.3 parts of aniline is reacted with 32 parts of 2-(N-R³)-naphthylamine as described in Example 131 to give a mixture of dyes of the formula:

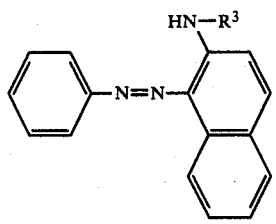

with

R³ = —CH₂—CH(C₂H₅)—(CH₂)₃—CH₃, —CH₂—C₁₂H₂₅ and
—(CH₂)₃—O—CH₂—CH(C₂H₅)—(CH₂)₃—CH₃ in the molar ratio of 1:1:1. The yield is 39 parts.

EXAMPLE 157

A mixture of dyes of the formula:

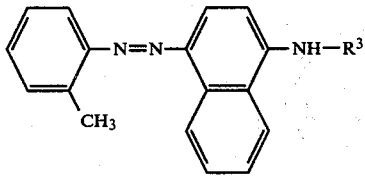

with

R³ = —CH₂—CH(C₂H₅)—(CH₂)₃—CH₃, —CH₂—C₁₂H₂₅ and

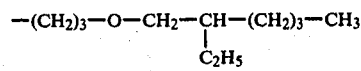

is obtained by the reaction of 10.7 parts of 2-methyl-1-aminobenzene with 32 parts of 1-(N-R³)-naphthylamine as described in Example 131. It is suitable for coloring motor fuels, fuel oils, surface coatings, waxes and fats. The yield is 42 parts.

We claim:

1. A compound of the formula

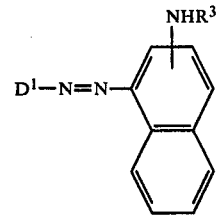

wherein:

D¹ is phenylazophenyl or tolylazotolyl; and
R³ is n-hexyl, n-octyl, 3,5,5-trimethylhexyl, tridecyl, β-ethylhexoxypropyl, cyclohexyl, benzyl or phenylethyl.

2. A dyestuff of the formula

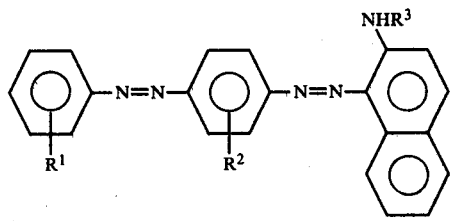

in which R¹ and R² independently of one another are selected from the group consisting of hydrogen, alkyl of one to four carbon atoms, methoxy or ethoxy, and R³ is straight chain alkyl of four to twenty-one carbon atoms.

3. An azo dye of the formula

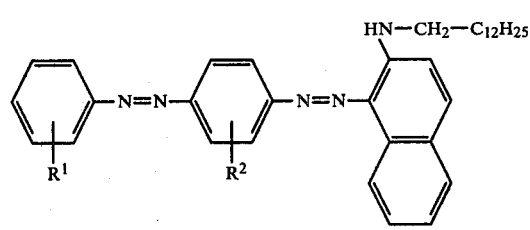

wherein R¹ and R² are independently of one another hydrogen or alkyl of 1 to 4 carbon atoms in the ortho or meta position.

4. The azo dye as defined in claim 3 wherein R¹ and R² are hydrogen.

5. An azo dye as defined in claim 3 wherein R¹ and R² are methyl.

6. The azo dye as defined in claim 3 of the formula

7. The azo dye as defined in claim 3 of the formula

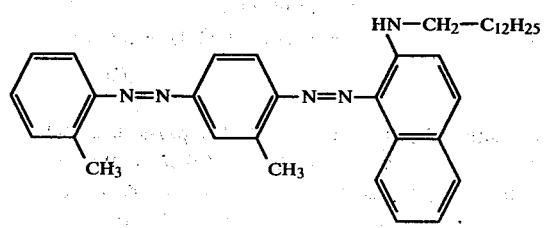

8. The azo dye of the formula

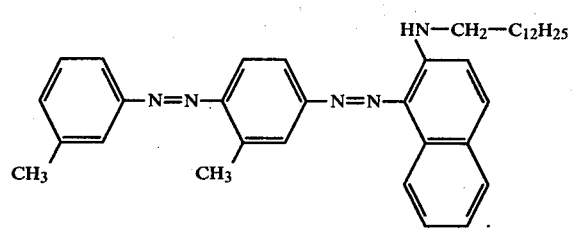

9. A mixture comprising an azo dye as defined in claim 3, 5 or 6 and an azo dye of the formula

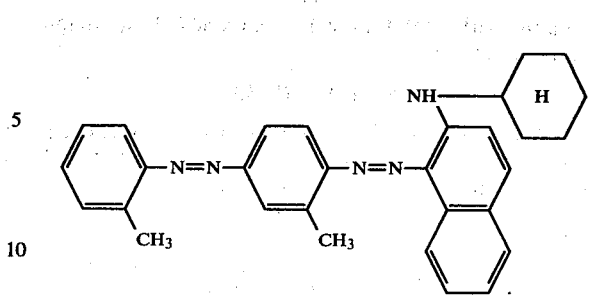

10. A mixture of azo dyes of the formulae

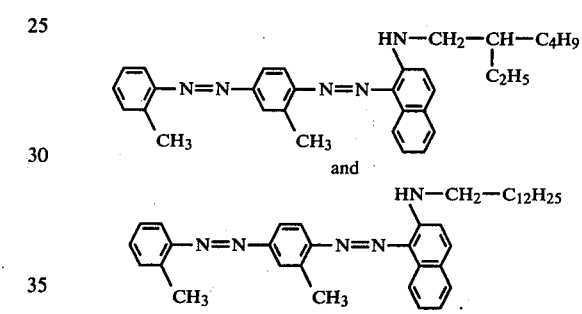

11. An azo dye having a high solubility in petroleum fuels and having the formula

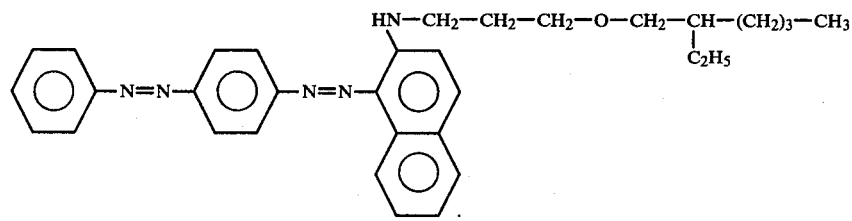

12. A colored petroluem fuel having dissolved therein an azo dye composition having the formula

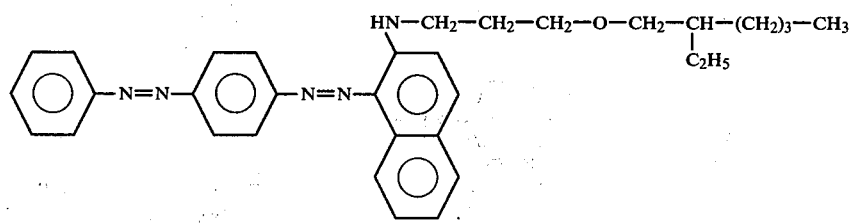

13. A colored petroleum fuel having dissolved therein a mixture of azo dyes as defined in claim 10.

* * * * *

UNITED STATES PATENT AND TRADEMARK OFFICE
CERTIFICATE OF CORRECTION

PATENT NO. : 4,315,756

DATED : February 16, 1982

INVENTOR(S) : Georg Zeidler, Johannes Dehnert, Guenter Hansen, and Guenther Riedel It is certified that error appears in the above-identified patent and that said Letters Patent is hereby corrected as shown below:

On the cover page, left side, following the section numbered "[22]" insert a section numbered and described as follows:

--[30]    Foreign Application Priority Data

Dec. 12, 1973 [DE]  Fed. Rep. of Germany ....... 2361758
    Mar. 20, 1974 [DE]  Fed. Rep. of Germany ....... 2413369
    July 16, 1974 [DE]  Fed. Rep. of Germany ....... 2434110 --.

Signed and Sealed this

Thirtieth Day of August 1983

[SEAL]

Attest:

Attesting Officer

GERALD J. MOSSINGHOFF

Commissioner of Patents and Trademarks